(12) United States Patent
Hui et al.

(10) Patent No.: US 9,019,849 B2
(45) Date of Patent: Apr. 28, 2015

(54) DYNAMIC SPACE DIVISION DUPLEX (SDD) WIRELESS COMMUNICATIONS WITH MULTIPLE ANTENNAS USING SELF-INTERFERENCE CANCELLATION

(75) Inventors: Dennis Hui, Sunnyvale, CA (US); Jiann-Ching Guey, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 697 days.

(21) Appl. No.: 13/290,677

(22) Filed: Nov. 7, 2011

(65) Prior Publication Data

US 2013/0114468 A1   May 9, 2013

(51) Int. Cl.

| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04J 1/00 | (2006.01) |
| H04B 7/10 | (2006.01) |
| H04L 1/02 | (2006.01) |
| H04B 1/00 | (2006.01) |
| H04B 15/00 | (2006.01) |

(Continued)

(52) U.S. Cl.
CPC ............... *H04L 5/14* (2013.01); *H01Q 3/2611* (2013.01); *H04B 7/0452* (2013.01); *H04B 7/0617* (2013.01); *H04B 7/0691* (2013.01); *H04B 7/0874* (2013.01); *H04B 7/0478* (2013.01)

(58) Field of Classification Search
USPC ............. 370/252, 281, 343; 375/347; 455/63, 455/501
See application file for complete search history.

(56) References Cited

U.S. PATENT DOCUMENTS 3,766,559 A * 10/1973 Butcher et al. ................ 342/368
6,141,335 A * 10/2000 Kuwahara et al. ............ 370/342

(Continued)

FOREIGN PATENT DOCUMENTS

EP    1 508 975 A1    2/2005
WO   WO 2007/149954 A1   12/2007

OTHER PUBLICATIONS

Larsson, P et al. MIMO On-Frequency Repeater with Self-Interference Cancellation and Mitigation. 2009 IEEE 69th Vehicular Technology Conference. Apr. 26-29, 2009.

(Continued)

*Primary Examiner* — Alpus H Hsu
*Assistant Examiner* — Yee Lam

(57) ABSTRACT

A system and method to perform Full Duplex (FD) Space Division Duplex (SDD) communication using a Self-Interference Cancelling (SIC) precoder that applies different antenna phase shifts and amplitude scales to the transmitted signals to force them to be in the null space of the selected receive antennas. Thus, a wireless communication unit can place nulls at each of its receive antennas digitally at baseband for one or more frequency bands. The SIC precoder may be computed based on the self-interference channel from the transmit chain(s) to the receive chain(s). Different SIC precoders may be adaptively selected and stored digitally for different frequency bands. Subsequent single or multi-user precoder can be applied in concatenation with the SIC precoder to transmit signals to one or more users while receiving signals from one or more users simultaneously over the same frequency band.

21 Claims, 8 Drawing Sheets

(51) Int. Cl.
*H03C 7/02* (2006.01)
*H04B 1/02* (2006.01)
*H04B 7/02* (2006.01)
*H04L 5/14* (2006.01)
*H01Q 3/26* (2006.01)
*H04B 7/06* (2006.01)
*H04B 7/08* (2006.01)
*H04B 7/04* (2006.01)

(56) References Cited

U.S. PATENT DOCUMENTS

| | | | |
|---|---|---|---|
| 2003/0090405 A1 | 5/2003 | Rauch et al. | |
| 2007/0183479 A1* | 8/2007 | Noll et al. | 375/132 |
| 2007/0225042 A1* | 9/2007 | Kitahara | 455/562.1 |
| 2008/0089397 A1* | 4/2008 | Vetter et al. | 375/220 |
| 2009/0237294 A1* | 9/2009 | Shoji et al. | 342/159 |
| 2010/0022201 A1* | 1/2010 | Vandenameele | 455/78 |
| 2010/0027697 A1* | 2/2010 | Malladi et al. | 375/260 |
| 2011/0081901 A1 | 4/2011 | Moulsley et al. | |
| 2011/0243040 A1* | 10/2011 | Khan et al. | 370/280 |
| 2013/0034129 A1* | 2/2013 | Coldrey et al. | 375/211 |

OTHER PUBLICATIONS

Weeraddna, P et al. The Benefits from Simultaneous Transmission and Reception in Wireless Network. Information Theory Workshop (ITW), 2010 IEEE. Aug. 30, 2010.

Spencer, Q. et al. An Introduction to the Multi-User MIMO Downlink. IEEE Communications Magazine vol. 42 Issue 10, Oct. 2004.

* cited by examiner

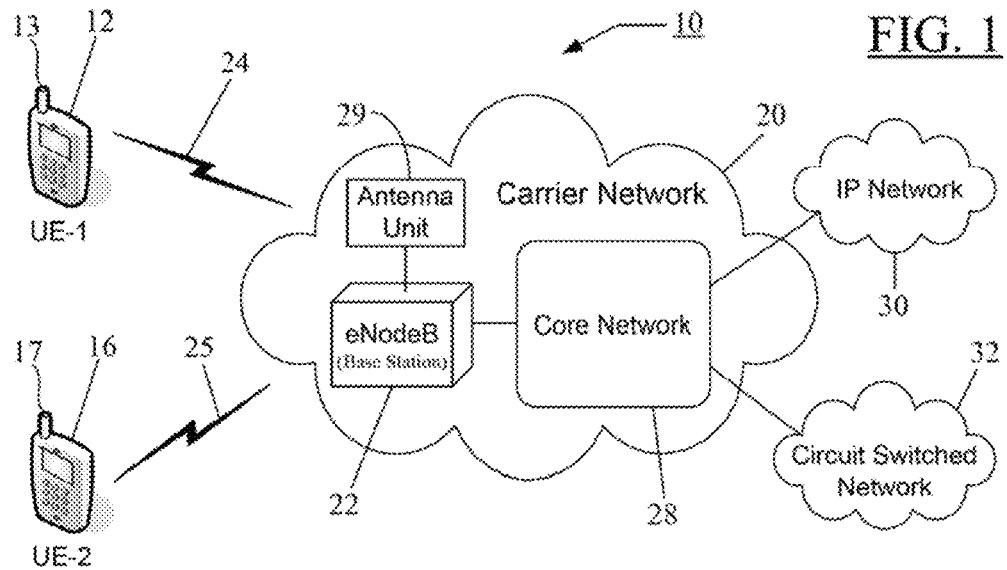
FIG. 1
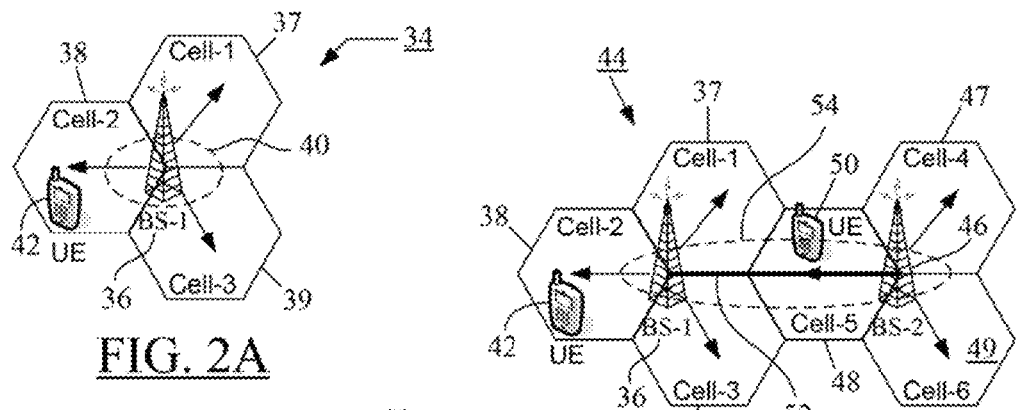
FIG. 2A
FIG. 2B
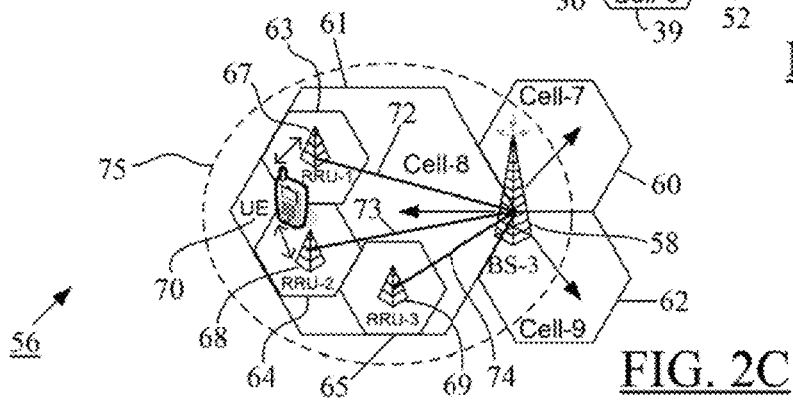
FIG. 2C

DYNAMIC SPACE DIVISION DUPLEX (SDD) WIRELESS COMMUNICATIONS WITH MULTIPLE ANTENNAS USING SELF-INTERFERENCE CANCELLATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

With ever-increasing demand for wireless communication and broadband services, there is an ongoing evolution of Third Generation (3G) and Fourth Generation (4G) cellular networks like High Speed Packet Access (HSPA), Evolution-Data Optimized (EV-DO), Long Term Evolution (LTE), Worldwide Interoperability for Microwave Access (WiMAX), International Mobile Telecommunications-Advanced (IMT-Advanced) (e.g., LTE Advanced), etc., to support ever-increasing performance with regard to capacity, peak bit rates and coverage. In case of a mobile communication environment, such as Third Generation Partnership Project's (3GPP) LTE network, the Evolved Universal Terrestrial Radio. Access (EUTRA) or Evolved Universal Terrestrial Radio Access Network (E-UTRAN) air interface for LTE may support wireless broadband data service at a rate of up to 300 Mbps in the downlink (DL) and 75 Mbps in the uplink (UL).

In traditional wireless communication systems, radio signals are not being transmitted and received on the same frequency at the same time. The main hindrance in simultaneous transmission and reception (also known as "full duplex" communication) is that broadcasted radio signals are attenuated rapidly over distance, causing a drastic difference in transmitted and received signal power levels such that, during such simultaneous transmission and reception, the received signal by a wireless unit is often overshadowed by the unit's own transmitted signal during analog-to-digital conversion. Such "self-interference" is especially true for macro cellular communication systems where the distance between two wireless units is large (so that a unit wishing to perform simultaneous transmission and reception may encounter significant self-interference). As a result, uplink and downlink transmission resources are typically divided either in frequency, as in Frequency Division Duplex (FDD), or in time, as in Time Division Duplex (TDD) communications. Such division in radio resources is also typically fixed for the entire network to avoid mutual interference between the bi-directional communications.

However, as wireless data communications become increasingly popular, it is anticipated that significantly denser deployment of wireless access nodes or base stations will be required in the future to cope with the exponential growth in data traffic. As the distance among access nodes reduces, the relative power difference between the transmitted and received signals at any access node also reduces significantly. In this case, full-duplex radio communications (i.e., simultaneous transmissions and receptions) may be feasible with the use of certain self-interference cancellation techniques. This is especially true for device-to-device communications (versus communications between a wireless device and its access node or base station), which is expected to play a major role in future radio access. It is also true in a super-dense cellular network where over-provisioning of radio resources is achieved through numerous short-range, low-power access points over a large bandwidth available at a high frequency range (e.g., the mini-meter wave range of 30-100 GHz).

It is observed here that the potential gain in spectral efficiency provided by full duplex communications is substantial over FDD and TDD communications because the total available radio resources need not be divided. The potential benefits of full-duplex communication to a wireless network has been evaluated and analyzed in P. C. Weeraddana, M. Codreanu, M. Latva-aho, and A. Ephremides, "The Benefits from Simultaneous Transmission and Reception in Wireless Networks," Proc. 2010 IEEE Information Theory Workshop, Dublin.

In M. Duarte and A. Sabharwal, "Full-Duplex Wireless Communications Using Off-The-Shelf Radios: Feasibility and First Results," Proceedings of Asilomar Conference on Signals, Systems, and Computers, 2010 (hereafter "Paper-1"), it was proposed that the self-interference from the transmitted signal may be suppressed at the receiver using an analog cancellation circuitry at radio frequency and/or a digital cancellation module at baseband frequency. Both of these cancellation techniques try to subtract the known transmitted signal from the received signal.

In J. Choi, M. Jain, K. Srinivasan, P. Leis, and S. Katti, "Achieving Single Channel, Full Duplex Wireless Communication," Proceedings of MOBICOM 2010, pp. 1-12, 2010 (hereafter "Paper-2"), it was proposed that, in addition to the analog and digital cancellations mentioned above, two transmit antennas and one receive antenna may be placed at fixed, preset locations in such a way that the receive antenna is located at a null position where the two radio signals transmitted from the two transmit antennas are added destructively.

SUMMARY

The present invention relates to self-interference cancellation for full-duplex radio communication. More particularly, and not by way of limitation, the present invention is directed to a system and method that enables a multi-antenna wireless device to digitally place nulls at each of its receive antennas at baseband for one or more frequency bands by adjusting the relative amplitudes and relative phases of data streams transmitted through the transmit antennas of the device.

As discussed above, various schemes have been proposed to tackle self-interference in wireless devices. However, certain issues still remain unresolved. For example, in the scheme of Paper-1, the remaining self-interference power after analog and/or digital cancellation is still quite significant and it substantially limits the achievable data rate of the receiver. Furthermore, to attain the potential gain in data throughput promised by full-duplex communications, the transmit and receive antennas, as suggested in Paper-1, would also need to be physically separated far apart to provide additional attenuation in the interfering signal. However, such physical separation has undesirable impacts on the size and form factor of a wireless device.

In case of the scheme in Paper-2, although significant suppression of the self-interference may be possible, it requires an extra transmit antenna to provide cancellation for each receive antenna, and the separation distances among these antennas are frequency dependent so that different distances are needed for different frequency bands. Moreover, even for a single frequency band, with a larger number of receive (and transmit) antennas, these specific separation distances or antenna locations cannot be straightforwardly generalized and can lead to undesirable limitations on the size and the form factor of a wireless device.

It is therefore desirable to provide self-interference cancellation without the onerous requirement of adjusting physical distances between transmit and receive antennas in a frequency-dependent manner. It is also desirable to obtain substantial self-interference cancellation over one or more frequency bands through digital means so as to enable wireless access nodes or devices to more fully and efficiently utilize the entire available radio spectrum for full-duplex communication without any negative effects on the size and form factor of a wireless device.

Particular embodiments of the present invention may provide a solution to the above-mentioned problem of effectively and efficiently providing self-interference cancellation without requiring physical adjustments of antenna locations or distances in a frequency-dependent manner and, hence, without negatively affecting the size and form factor of a wireless device. In particular embodiments of the present invention, the division in radio resources for uplink and downlink communications is accomplished over the space or antenna domain to perform bi-directional Space Division Duplex (SDD) communication. Certain embodiments of the present invention employ a Self-Interference Cancelling (SIC) precoder that applies antenna-specific and data-stream-specific phase shifts and amplitude scales to the transmitted signals to impose certain relationships in the phases and the amplitudes of the radio signals transmitted across different antennas. Such relationships force the transmitted signals to be in the null space of the selected receive antennas. The SIC precoder coefficients (or weights) may be computed based on the self-interference channel from the transmit chains to the receive chain(s), which often stays unchanged for a long period of time. Different sets of SIC precoder coefficients may be adaptively selected and stored digitally for different frequency bands. Subsequent single or multi-user precoder can be applied in concatenation with the SIC precoder to transmit signals to one or more users while receiving signals from one or more users simultaneously over the same frequency band.

In one embodiment, the present invention is directed to a method of providing full-duplex communication in a pre-determined frequency band using a wireless communication unit having a plurality of antennas. The method comprises the steps of: (i) the wireless unit receiving one or more receive data streams in the pre-determined frequency band utilizing a first subset of the plurality of antennas, wherein the first subset includes at least one antenna from the plurality of antennas as a receive antenna; (ii) the wireless unit simultaneously transmitting one or more transmit data streams in the predetermined frequency band utilizing a second subset of the plurality of antennas, wherein the second subset includes less than or equal to the total number of antennas in the plurality of antennas as transmit antennas; and (iii) the wireless unit adjusting the relative amplitudes and relative phases of radio signals carrying the transmit data streams that are transmitted through the transmit antennas in the pre-determined frequency band, thereby configuring all transmit antennas to collectively place a substantial null at each receive antenna when transmitting in the pre-determined frequency band.

In another embodiment, the present invention is directed to an improvement in a method to provide self-interference cancellation during full-duplex communication in a predetermined frequency band using a multi-antenna wireless system that simultaneously transmits and receives signals during the full-duplex communication using one or more antennas thereof. The improvement comprises: adjusting the relative amplitudes and relative phases of signals transmitted in the pre-determined frequency band through the transmitting antennas of the wireless system in such a manner as to place a substantial null at each receiving antenna of the wireless system receiving at least a portion of the transmitted signals.

In yet another embodiment, the present invention is directed to a wireless communication unit having a plurality of antennas to provide full-duplex communication at a given frequency in a pre-determined frequency band. The wireless communication unit is configured to perform the following: (i) receive one or more receive data streams in the predetermined frequency band utilizing a first subset of the plurality of antennas, wherein the first subset includes at least one antenna from the plurality of antennas as a receive antenna; (ii) simultaneously transmit one or more transmit data streams in the predetermined frequency band utilizing a second subset of the plurality of antennas as transmit antennas, wherein the subset includes less than or equal to the total number of antennas in the plurality of antennas; and (iii) adjust the relative amplitudes and relative phases of radio signals carrying the transmit data streams that are transmitted through the transmit antennas in the pre-determined frequency band, thereby configuring all transmit antennas to collectively place a substantial null at each receive antenna when transmitting in the pre-determined frequency band.

Particular embodiments of the present invention thus provide a method of exploiting the ever-increasing number of antennas in wireless access nodes or devices to more fully and efficiently utilize the valuable spectrum by allowing the antennas to transmit and receive simultaneously over the entire available spectrum. Instead of requiring a receive antenna to be physically placed at a null where the transmitted signals add destructively as proposed in Paper-2 mentioned above, a wireless device or access node may be allowed to place nulls at each of its receive antennas digitally at baseband for one or more frequency bands. It therefore provides wireless access nodes or devices with larger flexibility in partitioning the spectrum for communications in different directions and paves the way to unify the radio resource management in uplink and downlink. Particular embodiments of the present invention may also be beneficial when the distance between the communication devices are short so that the transmit and receive power levels are more comparable. This is the case in a super-dense network where there are abundant low-power access nodes that are very close to the served users. This also may be the case in device-to-device communications (especially when devices operate in close proximity with almost same power levels), which is expected to play a major role in future wireless communications.

BRIEF DESCRIPTION OF THE DRAWINGS

In the following section, the invention will be described with reference to exemplary embodiments illustrated in the figures, in which:

FIG. 1 is a diagram of an exemplary wireless system in which self-interference cancellation according to the teachings of one embodiment of the present invention may be implemented as part of bi-directional Space Division Duplex (SDD) communication;

FIGS. 2A through 2C illustrate exemplary Coordinated Multi-Point (CoMP) transmission and reception arrangements in which self-interference cancellation according to one embodiment of the present invention may be implemented;

DETAILED DESCRIPTION

Figure 3:
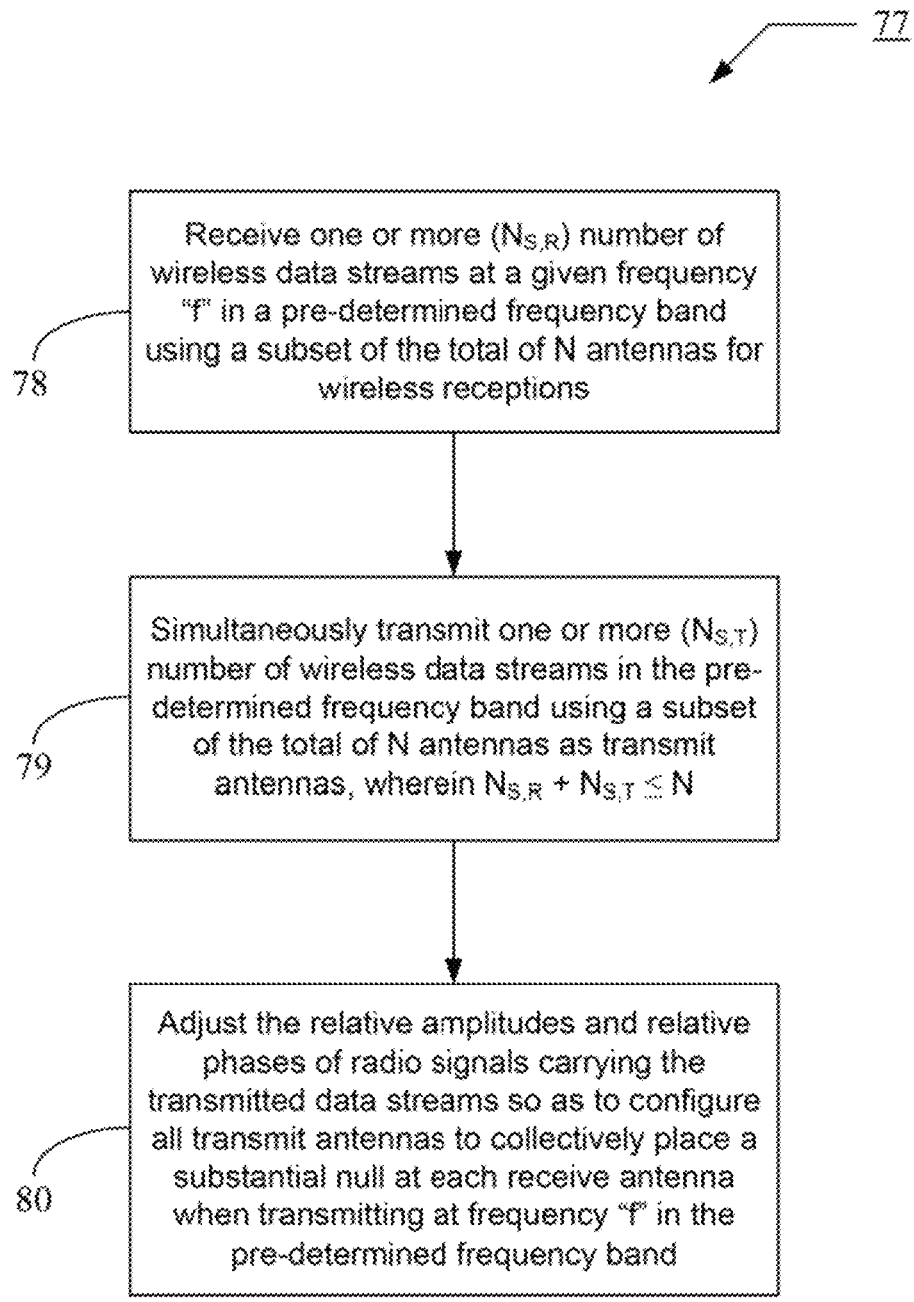
FIG. 3 depicts an exemplary flowchart to provide self-interference cancellation according to one embodiment of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the invention can be implemented in other forms of cellular or non-cellular wireless networks as well (for example, a corporate-wide wireless data network, a point-to-point wireless communication network such as a wireless walkie-talkie network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "pre-determined," "self-interference," etc.) may be occasionally interchangeably used with its non-hyphenated version (e.g., "predetermined," "self interference," etc.), a capitalized entry (e.g., "Uplink") may be interchangeably used with its non-capitalized version (e.g., "uplink"), an italicized term (e.g., "N", "f") may be interchangeably used with its non-italicized version (e.g., "N", "f"), and plural terms may be indicated with or without an apostrophe (e.g., UE's or UEs, CC's or CCs). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including component diagrams) shown and discussed herein are for illustrative purpose only, and are not drawn to scale.

FIG. 1 is a diagram of an exemplary wireless system 10 in which self-interference cancellation according to the teachings of one embodiment of the present invention may be implemented as part of bidirectional Space Division Duplex (SDD) communication. The system 10 may include a plurality of mobile handsets; two of which are shown in FIG. 2 and identified by reference numerals 12 and 16. Each mobile handset 12, 16 may include a corresponding antenna unit 13, 17. To facilitate full-duplex communication of multiple data streams (or layers), in one embodiment, each of the antenna units 13, 17 may include two or more antennas (not shown individually), each such antenna can perform simultaneous transmission and reception at a given frequency "f". The mobile handsets 12, 16 are shown to be in wireless communication with a carrier network 20 of a wireless service provider (or operator) through a wireless access (or communication) node 22 of the carrier network 20. The access node 22 may be, for example, a base station in a 3G network, or an evolved Node-B (eNodeB) or Home eNodeB (HeNB) when the carrier network is a Long-Term Evolution (LTE) network, or any other home base station or femtocell, and may provide radio interface to the mobile handsets 12, 16. In other embodiments, the communication node 22 may also include a site controller, an access point (AP), or any other type of radio interface device capable of operating in a wireless environment. It is noted here that the terms "mobile handset," "wireless handset," "wireless device," "terminal," and "user equipment (UE)" may be used interchangeably herein to refer to a wireless communication device that is capable of voice and/or data communication via a wireless carrier network. Some examples of such mobile handsets/devices include cellular telephones or data transfer equipments (e.g., a Personal Digital Assistant (PDA) or a pager), smartphones (e.g., iPhone™, Android™, Blackberry™, etc.), computers, Bluetooth® devices, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UEs).

In addition to providing air interface or communication channel (e.g., as represented by wireless links 24-25 in FIG.

1) to the UEs 12, 16 via an antenna unit 29, the access node 22 may also perform radio resource management (as, for example, in case of an eNodeB or HeNB in an LTE system) using, for example, channel feedbacks received from the UEs 12, 16 operating in the network 20. The carrier network 20 may support a spatial diversity or spatial multiplexing scheme having multiple transmission layers (e.g., a Multi User (MU) Multiple Input Multiple Output (MIMO) scheme), and the communication channel (e.g., a Radio Frequency (RF) channel) between the base station and the wireless terminals may provide a conduit for the signals exchanged between the base station 22 and UEs 12, 16 under the spatial diversity scheme. The eNB antenna unit 29 may also include two or more antennas (not shown individually) to support full-duplex communication of multiple data streams at the eNB 22 (e.g., by facilitating reception of MIMO signals from multiple UEs 12, 16). Each base station antenna can also perform simultaneous transmission and reception at a given frequency as discussed in more detail hereinbelow.

Figure 10:
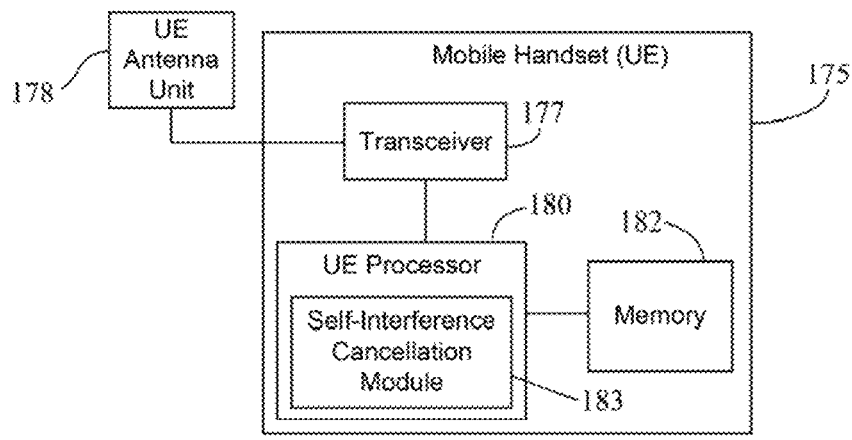
FIG. 10 is a block diagram of an exemplary mobile handset or UE according to one embodiment of the present invention.
Figure 11:
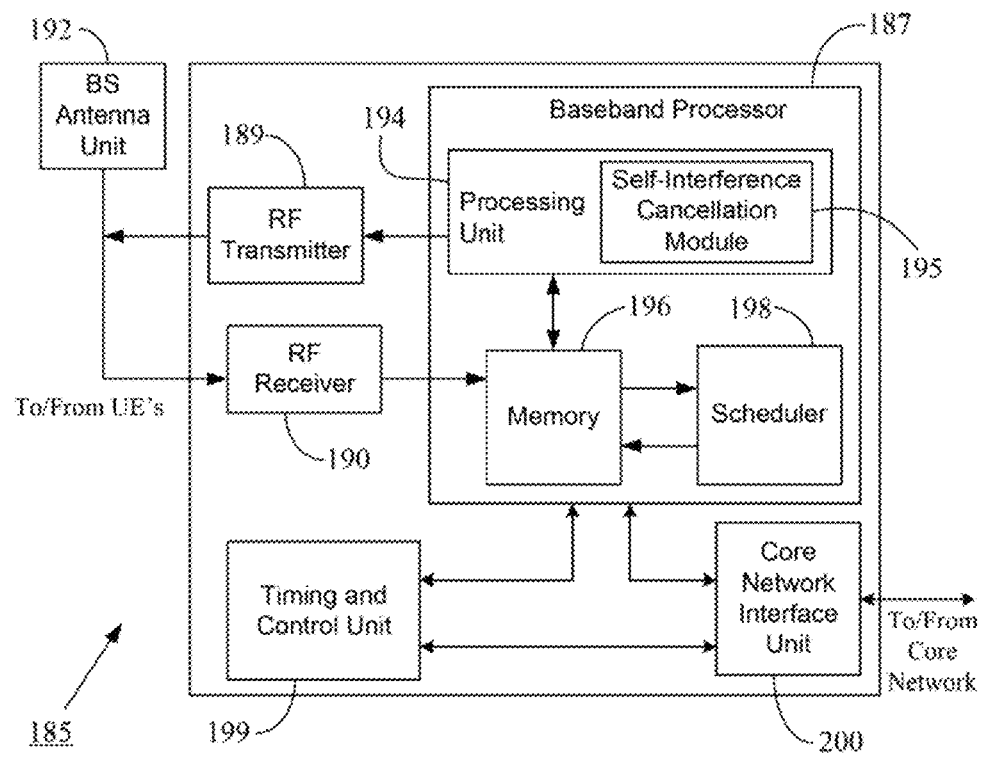
FIG. 11 is a block diagram of an exemplary eNB or a similar wireless access node (or base station) according to one embodiment of the present invention.

Although the discussion below is provided primarily in the context of an LTE network, the teachings of the present invention may equally apply, with suitable modifications (as may be apparent to one skilled in the art using the present teachings), to a number of different wireless systems or networks, such as, for example, standard-based systems/networks using 3G/4G specifications or non-standard based systems. Some examples of such systems or networks include, but not limited to, Global System for Mobile communications (GSM) networks, Wideband Code Division Multiple Access (WCDMA) systems, WCDMA-based HSPA systems, CDMA2000 systems, EV-DO systems, WiMAX systems, IMT-Advanced systems, other UTRAN/E-UTRAN networks, GSM/Enhanced Data Rate for GSM Evolution (GSM/EDGE) systems, a non-standard based proprietary corporate wireless network, etc., when self-interference cancellation is performed. Also, because the teachings of the present invention may be applied to both Uplink (UL) and Downlink (DL) signal receptions in LTE, the methodology of the present invention can be implemented in either a base station (e.g., the eNB 22) or a base station/"super base station" operating in a Coordinated Multi-Point (COMP) transmission and reception arrangement discussed below with reference to FIGS. 2A-2C or a UE (e.g., the UE's 12, 16 in FIG. 1, or UE's 42, 50, 70 in FIG. 2), or both. The teachings of the present invention may also apply to any other non-cellular wireless transceiver performing simultaneous transmissions and receptions over multiple antennas. Therefore, in the discussion below, the term "wireless communication unit" (or, simply, "communication unit" or "wireless unit") may be used to refer to any of these entities based on the context of discussion—i.e., whether a base station (or wireless access node/access point) or a UE or a wireless transceiver operable in a non-cellular wireless system (e.g., a corporate wireless network, a proprietary walkie-talkie system, etc.) or a wireless transceiver communicating with another wireless transceiver (whether in a wireless network-based configuration or without a wireless network). Two exemplary wireless communication units 175 and 185 are shown in FIGS. 10 and 11, respectively, and discussed in more detail below.

Referring again to FIG. 1, in case of a 3G carrier network 20, the communication node 22 may include functionalities of a 3G base station along with some or all functionalities of a 3G Radio Network Controller (RNC), and may be configured to provide self-interference cancellation as discussed below. Communication nodes in other types of carrier networks (e.g., 4G networks and beyond) also may be configured similarly. In one embodiment, the node 22 may be configured (in hardware, via software, or both) to implement self-interference cancellation as described herein. For example, when existing hardware architecture of the access node 22 cannot be modified, the self-interference cancellation methodology according to one embodiment of the present invention may be implemented through suitable programming of one or more processors (e.g., processor 187 (or, more particularly, processing unit 194) in FIG. 11) in the access node 22. The execution of the program code (by a processor in the node 22) may cause the processor to perform self-interference cancellation as discussed herein. Similarly, one or more of the UE's 12, 16 may be suitably configured (in hardware and/or software) to implement the self-interference cancellation methodology described herein. In one embodiment, the eNB 22 and the UE's 12, 16 (if applicable) may include a self-interference cancellation module as part of their processing units (as shown by way of examples in FIGS. 10 and 11 and discussed below) and configured to carry out self-interference cancellation related computations. Thus, in the discussion below, although a communication unit—whether the communication node 22 or any of the UEs 12, 16—may be referred to as "performing," "accomplishing," or "carrying out" a function or process, it is evident to one skilled in the art that such performance may be technically accomplished in hardware and/or software as desired.

The carrier network 20 may include a core network 28 coupled to the communication node 22 and providing logical and control functions (e.g., subscriber account management, billing, subscriber mobility management, etc.) in the network 20. In case of an LTE carrier network, the core network 28 may be an Access Gateway (AGW). Regardless of the type of carrier network 20, the core network 28 may function to provide connection of one or more of the UEs 12, 16 to other mobile handsets operating in the carrier network 20 and also to other communication devices (e.g., wireline or wireless phones) or resources (e.g., an Internet website) in other voice and/or data networks external to the carrier network 20. In that regard, the core network 28 may be coupled to a packet-switched network 30 (e.g., an Internet Protocol (IP) network such as the Internet) as well as a circuit-switched network 32 such as the Public-Switched Telephone Network (PSTN) to accomplish the desired connections beyond the devices operating in the carrier network 20. Thus, through the communication node's 22 connection to the core network 28 and a handset's radio link with the communication node 22, a user of the handset (e.g., UE 12 or 16) may wirelessly (and seamlessly) access many different resources or systems beyond those operating within the carrier network 20 of an operator.

As is understood, the carrier network 20 may be a cellular telephone network or a Public Land Mobile Network (PLMN) in which the UE's 12, 16 may be subscriber units. However, as mentioned before, the present invention is operable in other non-cellular wireless networks as well (whether voice networks, data networks, or both) or in a non-networked environment (e.g., in peer-to-peer communications). Furthermore, portions of the carrier network 20 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 20 may be connected to the Internet via its core network's 28 connection to the IP (packet-switched) network 30 or may include a portion of the Internet as part thereof. In one embodiment, a network may include more or less or different type of functional entities than those shown in the context of carrier network 20 in FIG. 1.

FIGS. 2A through 2C illustrate exemplary Coordinated Multi-Point (CoMP) transmission and reception arrangements 34, 44, and 56 in which self-interference cancellation according to one embodiment of the present invention may be implemented. FIG. 2A depicts an exemplary intra-site CoMP arrangement 34 showing a base station (BS) 36 controlling wireless radio communication within three cell sites 37-39. As part of CoMP transmissions and receptions, the BS 36 may be configured (as indicated by dotted oval 40) to co-ordinate the BS's 36 communication with a UE 42 operating in the BS's cell-edge region so as to improve coverage, cell-edge throughput, and/or system efficiency. In one embodiment, as part of this coordination, the BS 36 also may be configured to perform self-interference cancellation as described herein using the antennas (not shown) from all three cell sites. FIG. 2B shows an exemplary inter-site CoMP architecture 44 in which cell sites 37-39 of base station 36 in FIG. 1 are depicted along with cell sites 47-49 of a second base station 46. Like the UE 42, another UE 50 may be operating in the cell-edge region of the BS 46 (which region may be adjacent to BS's 36 cells 37, 39 as shown in FIG. 2B by way of an example). To provide CoMP transmissions and receptions in the arrangement 44 of FIG. 2B, the base stations 36, 46 may be connected to each other (e.g., via one or more fiber links 52) and may be jointly configured to provide desired CoMP coordination (as indicated by dotted oval 54). Such joint coordination may include, for example, a coordinated scheduling of radio resources for UEs 42 and 50 using a central controller/processor (not shown) controlling both of these base stations 36, 46. In one embodiment, as part of their CoMP configuration, the controller may treat both of the base stations 36, 46 together as a single base station (which can be referred to as a "super base station") for self-interference cancellation using the antennas from both of the base stations—i.e., geographically-distributed antennas (not shown) of these base stations 36, 46 may be considered together when determining self-interference cancellation.

FIG. 2C, on the other hand, illustrates an exemplary CoMP architecture 56 based on a distributed eNB/base station 58. One or more cell sites 60-62 managed by the BS 58 may include "sub-cells" (e.g., sub-cells 63-65 illustrated for the cell site 61), each such sub-cell may include a Radio Remote Unit (RRU) (e.g., RRU's 67-69 in FIG. 2C) of the eNB 58 to provide radio communication support to UE's operating therewithin (e.g., one such UE 70 is shown in FIG. 2C). Although not shown for brevity, it is noted here that other cells 60, 62 may also include RRUs. Thus, in the arrangement 56 in FIG. 2C, some or all of the antennas of the BS 58 may not be co-located at a single physical location, but rather may be geographically distributed at different locations in space as indicated by distributed RRUs 67-69 in the exemplary sub-cell scenario in FIG. 2C. The distributed antennas (or RRUs) may be connected to a central computing facility (e.g., a computing unit (not shown) in the BS 58 itself) through wiring (e.g., via fiber links 72-74 shown in FIG. 2C). The central computing facility may perform computations of adaptive nulls at some of the distributed antennas as part of its CoMP coordination functionality. Although CoMP coordination (indicated by dotted oval 75 in FIG. 2C) may be within a single eNB in the CoMP arrangement 56 in FIG. 2C, the arrangement 56 may still be treated similar to the inter-site architecture 44 in FIG. 2B because of distributed nature of BS antennas. Thus, in case of FIG. 2C as well, the BS 58 also may be considered a "super base station" with antennas distributed in various geographical areas.

Thus, through various CoMP arrangements in FIGS. 2A-2C, it is observed here that, in one embodiment, the earlier-mentioned term "wireless communication unit" (or, simply, "communication unit" or "wireless unit") also may be understood to refer to a "super base station" (which may include multiple base stations or a single base station with geographically-distributed antennas as discussed above) or any other access node/base station (or eNB) operating under a CoMP arrangement.

FIG. 3 depicts an exemplary flowchart 77 to provide self-interference cancellation according to one embodiment of the present invention. The flowchart 77 broadly illustrates a methodology to digitally perform self-interference cancellation. As indicated at block 78, a wireless communication unit (e.g., the UE 12, eNB 22, etc.) may receive one or more (here, $N_{S,R}$) number of receive data streams at a given frequency "f" in a pre-determined frequency band. The data streams may be received in a wireless network (e.g., the network 20 in FIG. 1) in which the communication unit may be operating. In one embodiment, the data streams may be received utilizing a subset of the total number of "N" antennas in the communication unit, wherein the subset includes at least one antenna as a receive antenna. As indicated at block 79, the wireless communication unit may also simultaneously transmit one or more (here $N_{S,T}$) number of transmit data streams in the network at frequency "f" (in the pre-determined frequency band) utilizing all or a subset of the antennas in the communication unit as transmit antennas. Because each antenna in the wireless unit can be used to simultaneously transmit and receive at a given frequency f, in general, on the receiving side, the wireless unit can receive less than or equal to $N_R$ data streams with $N_R$ number of receive antennas (which may form a subset of the total number of antennas as mentioned above) ($0 \leq N_{S,R} \leq N_R \leq N$), and it can simultaneously transmit less than or equal to N data streams with N (or a subset of N) transmit antennas ($0 \leq N_{S,T} \leq N$). It is noted here that variables $N_{S,R}$ and $N_{S,T}$ represent the actual number of data streams received and transmitted, respectively. Therefore, in one embodiment, the total number of simultaneously received and transmitted data streams is less than or equal to the total number of antennas in the wireless communication unit (i.e., $N_{S,R} + N_{S,T} \leq N$).

Given a total number of "N" antennas in the wireless communication unit, particular embodiments of the present invention may implement a method of processing the signals/data streams to be transmitted over these antennas in such a manner as to enable the wireless unit to receive up to $N_{S,R}$ data streams ($N_{S,R} > 0$) while simultaneously transmitting up to $N_{S,T}$ data streams ($N_{S,T} > 0$) using the entire available frequency band (from which frequency "f" may be selected). In other words, the division in radio resources for uplink and downlink communications is accomplished over the space or antenna domain, as opposed to the frequency or time domains as in Frequency Division Duplex (FDD) or Time Division Duplex (TDD). Such division may also be changed dynamically, adaptively, and in a frequency-dependent or time-dependent manner, according to the relative demands on the two communication directions. Such division of radio resources for the bidirectional communication may be referred to herein as (dynamic) Space Division Duplex (SDD). For example, in an SDD communication with three antennas (N=3), a wireless communication unit can receive two (or one) stream(s) ($N_{S,R}$) while respectively transmitting one (or two) stream(s) ($N_{S,T}$) of data simultaneously over the whole available frequency band. As indicated at block 80 in FIG. 3, in one embodiment, the wireless communication unit may adjust the relative amplitudes and relative phases of radio signals carrying the transmitted data streams in such a manner as to configure all transmit antennas to collectively place a substantial null at each receive antenna when transmitting at the given frequency "f" (in the pre-determined frequency band). Such destructive interference or "null" from transmit antennas substantially eliminates self-interference from transmitted signals at receive antennas of the unit, allowing receive antennas to simultaneously receive data streams without being overshadowed by wireless unit's own transmitted signals.

As discussed in more detail below with reference to FIGS. 4-9, in one embodiment, particular embodiments of the present invention employ a Self-Interference Cancelling (SIC) precoder to apply antenna-specific and data-stream-specific phase shifts and amplitude scales to the transmitted radio signals (which, in one embodiment, may be transmitted using all N available antennas, as mentioned earlier) to force the signals to be in the null space of the selected receive antennas. The coefficients (or weights) of the SIC precoder may be computed based on the self-interference channel from the transmit chains to the receive chain(s), which often stays unchanged for a long-period of time. As also discussed in more detail below, different sets of SIC precoder coefficients (or weights) may be adaptively selected and stored digitally for different frequency bands. Subsequent single or multi-user (MU) precoder can be applied in concatenation with the SIC precoder to transmit signals to one or more users while receiving signals from one or more users simultaneously over the same frequency band.

Prior to continuing discussion of other figures, it is noted here that the term "data stream" may refer to a stream (or layer) of data, control, or any other kind of information bits or symbols. It is understood that in modern wireless communication units bits to-be-transmitted may be encoded and then interleaved (or scrambled) to produce a sequence of channel bits, which may be then mapped to modulation symbols to constitute a transmitted signal. A data stream may be transmitted using signals from one or more antennas, and may be received using signals from one or more antennas as well. For example, as mentioned earlier, $N_{S,T}$ number of data streams may be transmitted using up to a total of N antennas in the wireless unit and $N_{S,R}$ number of data streams may be received using a subset of N antennas (which subset may include $N_R$ antennas). As used herein, the term "signal" transmitted from each antenna refers to an analog radio signal with a certain amplitude, phase and frequency characteristics. On the other hand, the term "symbol" refers to complex-valued numbers carrying digital information content. (For example, a "symbol" may contain a number of information bits and may belong to certain constellation on the real-imaginary plane (e.g., the Quadrature Amplitude Modulation (QAM) symbols)). Each such "symbol" may include a plurality of encoded bits and multiple such "symbols" may be serially concatenated as a data stream as part of a single transmission from the wireless unit (using signals from one or more antennas). In case of an LTE network, for example, such transmission may include a radio frame having one or more subframes (not shown).

It is also noted here that although the discussion below is primarily provided with reference to a precoder, such discussion is exemplary only. Thus, the term "precoding" is used here in a representative capacity, and may also include aspects of "beamforming" in a given context, because the precoder-related discussion below may be suitably modified and applied to a system where beamforming is employed. Furthermore, the terms "relative amplitude" and "relative phase" may refer to a condition that amplitudes and phases of signals transmitted from one antenna in the wireless unit may be in relation to ("or "relative to") amplitudes and phases of signals (simultaneously) transmitted from other antennas in the wireless unit so as to produce the desired nulls at selected receive antennas. As discussed in more detail below, such relative adjustments of amplitudes and phases of transmitted signals may be accomplished using properly-computed precoder coefficients or weights.

Figure 4:
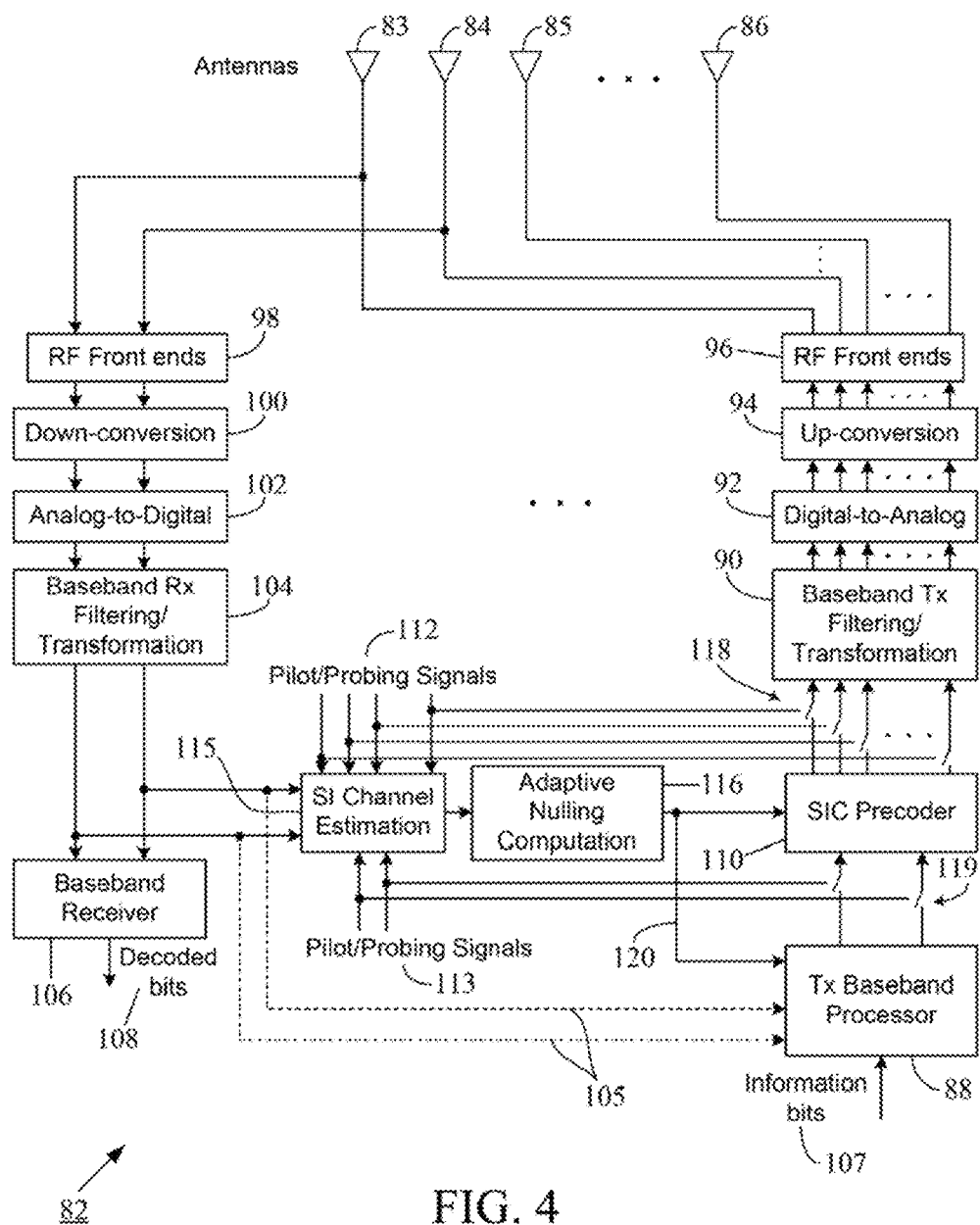
FIG. 4 shows an exemplary block diagram of a portion of a wireless device or access point implementing self-interference cancellation via adaptive nulling at baseband according to one embodiment of the present invention.

FIG. 4 shows an exemplary block diagram of a portion 82 of a wireless device or access point (each referred to more generally herein as a "wireless communication unit" as mentioned earlier and shown generally as wireless units 175 and 185 in FIGS. 10 and 11, respectively) implementing self-interference cancellation via adaptive nulling at baseband according to one embodiment of the present invention. The wireless communication unit may have a total number of N antennas, indexed by $\{1, 2, 3, \ldots, N\}$. Each of these antennas may be used for signal transmission as well as simultaneous signal reception. In FIG. 4, four (N=4) such antennas 83-86 are shown by way of an example. According to one embodiment of the present invention, all N antennas 83-86 may be connected to the corresponding transmit chains of the wireless unit (so as to be able to function as transmit antennas), while only some ($N_R$) of these N antennas (e.g., antennas 83, 84 in the embodiment of FIG. 4) may be connected to the receive chains of the wireless unit. In an alternative embodiment, less than N antennas (i.e., a subset of the total of N antennas) may be connected to transmit chains instead. It is observed here that, in the embodiment of FIG. 4, the number of receive antennas ($N_R$) is fixed, whereas it is variable in the embodiments of FIGS. 7 and 9 discussed later below. The fixed number ($N_R$) for receive antennas may be determined based on wireless operating environment (e.g., communication environment of the devices with which the wireless unit may be communicating, expected number of data streams to be received from such devices, etc.). In the embodiment of FIG. 4, one exemplary transmit chain (including a transmit (Tx) base band processor 88, a baseband Tx filtering unit 90, a Digital-to-Analog Converter (DAC) unit 92, an up converter 94, and a Radio Frequency (RF) frontend unit 96) is shown along with an exemplary receive chain (including an RF frontend unit 98, a down converter 100, an Analog-to-Digital Converter (ADC) unit 102, a baseband receive (Rx) filtering unit 104, and a baseband receiver 106. As is known, outgoing information bits 107 (i.e., information bits to be transmitted) may be received at the baseband frequency by the Tx baseband processor 88, which may perform necessary encoding/interleaving, map encoded bits onto appropriate digital modulated symbols, and send the symbols to the SIC precoder 110. The output of the SIC precoder is sent to the baseband Tx filtering/transformation unit 90 that may perform transformation (e.g., Inverse Fast Fourier Transform (IFFT) as is performed in LTE) and pulse-shaping filtering. The digital content from block 90 may be converted into analog form using the DAC unit 92, up-converted using an RF carrier frequency f at block 94, and transmitted via transmit antennas 83-86 using RF frontend unit 96. On the other hand, radio signals received by the receive antennas 83-84 at carrier frequency f may be fed to the down-converter unit 100 via the RF frontend unit 98. The down-converter 100 may remove the RF carrier and the ADC unit 102 may convert the analog down-converted signal to the digital content signal, which may be low-pass filtered and transformed (e.g., Fast Fourier Transform (FFT) as is performed in LTE) by the block 104 to recover the digitized received signal (or symbols) at baseband. The digitized baseband received signals/symbols at the output of the block 104 (also identified by reference numeral "105" and discussed later with reference to FIG. 6) may be subsequently demodulated and decoded by the baseband receiver unit 106 to recover the information content in the form of decoded information bits 108. In a wireless unit such as an access node, there may be more than one transmit and receive chain to accommodate simultaneous transmissions and receptions of multiple radio signals and data streams. The plurality of arrows going into and away from each functional block indicates that the sequence of functional blocks on the transmit (or receive) side of the figure may contain multiple transmit (or receive) chains.

It is observed here that because of simultaneous transmissions and receptions at the same frequency f using antennas 83-86, the transmitted signals may overshadow or interfere with received signals, causing self-interference for the wireless unit. Therefore, according to one embodiment of the present invention, a Self-Interference Cancelling (SIC) precoder 110 may be provided in the transmit chain of baseband signals to accomplish self-interference cancellation as discussed in more detail below. The computation of SIC precoder according to one embodiment of the present invention is now discussed herein with reference to FIGS. 4 and 5.

Let $N_R$ be the number of receive antennas fed into the receive chains of the wireless communication unit, and without loss of generality, let the first $N_R$ of the N antennas (like the first two antennas 83-84 shown in FIG. 4) to be those that are connected to the receive chains. Thus, it is understood that antennas other than or in addition to antennas 83-84 may be connected to the receive chains as well. However, for ease of discussion, the first two antennas 83 and 84 in the sequence of antennas 83-86 are shown connected to the receive chain as an example. Let $H_{SI}(f)$ denote the Self-Interference (SI) channel matrix of size $N_R$ by N at a particular frequency f in a desired (receive) frequency band B (which band may be pre-determined and may be selected from a plurality of pre-determined bands), whose element $[H_{SI}(f)]_{i,j}$ in the ith row and the jth column denotes the channel response from the jth (transmit) antenna to the ith (receive) antenna at frequency f (for the communication channel (not shown) established/existing between the transmit and receive antennas of the wireless communication unit when operating in the wireless network 20).

In one embodiment, based on an estimate of $H_{SI}(f)$, a SIC precoder (or precoder weight matrix) $P_{SIC}(f)$ 110 is computed, whose columns are basis vectors of the (right) null space of $H_{SI}(f)$. Thus, any baseband signal that passes through such precoder $P_{SIC}(f)$ 110 will place a substantial null at each of the receive chains when transmitted through all or a relevant subset of the N antennas. Each element in the SIC precoder weight matrix $P_{SIC}(f)$ specifies an antenna-specific and data-stream specific amplitude scale as well as an antenna-specific and data-stream specific phase shift. More precisely, the element at the ith row and the jth column of the SIC precoder matrix $P_{SIC}(f)$ is a complex-valued number whose magnitude and phase specify, respectively, the amplitude scale and phase shift to be applied to the (digitally modulated) symbols in the jth data streams for transmission at the ith antenna. These amplitude scales and phase shifts may be chosen (as described below) to ensure the transmitted radio signals add destructively at each of the receive chains to (collectively) form a substantial null, regardless of the information content of each data stream. Since the placement of the transmit and receive chains and antennas are all fixed in a wireless communication unit, the SI channel $H_{SI}(f)$ may not vary significantly over a long period of time and may only need to be estimated infrequently. In one embodiment, $H_{SI}(f)$ may depend on the internal temperature of the wireless unit and, hence, $H_{SI}(f)$ may not vary significantly over a long period of time. Consequently the SIC precoder 110 may not need to be changed for a prolonged period of time (e.g., when the wireless unit is calibrated before the first use, when the unit is powered on, or when it is idle, etc.).

It is noted here that the SI channel $H_{SI}(f)$, and thus $P_{SIC}(f)$, may depend on the frequency band B over which the radio signal is transmitted. Hence, different sets of SIC precoders $\{P_{SIC}(f)\}_{f \in B}$ may need to be computed and stored digitally for different frequency bands if the wireless access node or device supports operations over multiple bands. However, this is much more convenient than the technique proposed in Paper-2 where the physical placement of the antennas needs to be changed for different frequencies.

Figure 7:
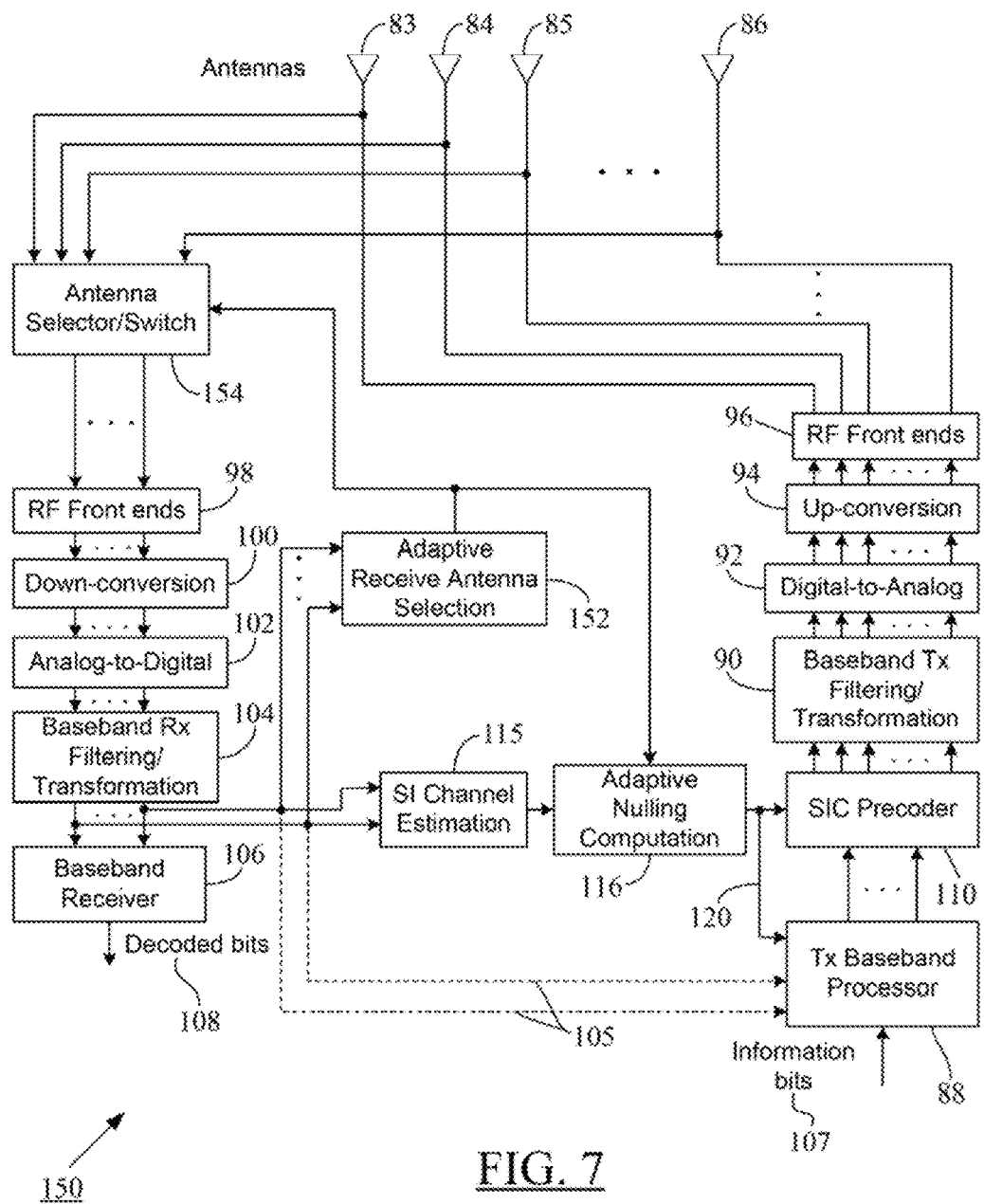
FIG. 7 shows the embodiment of FIG. 4 additionally including an adaptive receive antenna selection module according to one embodiment of the present invention.
Figure 9:
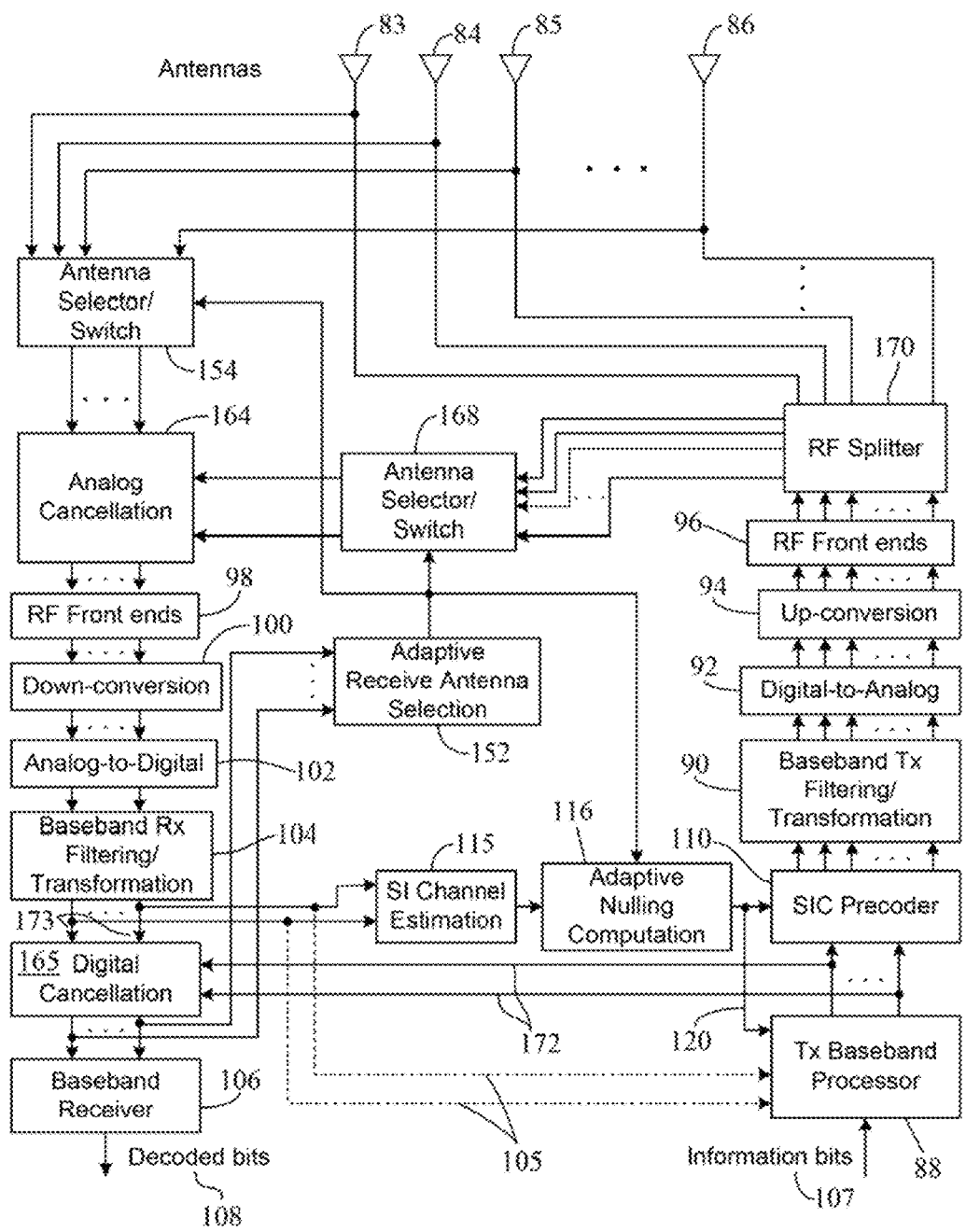
FIG. 9 shows the embodiment of FIG. 7 additionally including analog and digital cancellation modules according to one embodiment of the present invention.

Given an estimate $\hat{H}_{SI}(f)$ of $H_{SI}(f)$, the SIC precoder (or precoding weight matrix) $P_{SIC}(f)$ 110 can be computed as $$P_{SIC}(f) = V_{null}(\hat{H}_{SI}(f)) \quad (1)$$

where $V_{null}(A)$ denotes a matrix whose columns represent a set of orthonormal basis vectors of the right null space of the input matrix A. For example, in one embodiment, one can first compute a QR factorization of the matrix $\hat{H}_{SI}^H(f)$ (where the superscript $H$ denotes the Hermitian transpose of a matrix) as, $$\hat{H}_{SI}^H(f) = QR = [Q_1 \, Q_2] \begin{bmatrix} R_1 \\ 0 \end{bmatrix} \quad (2)$$

where Q, $Q_1$ and $Q_2$ are orthonormal matrices of sizes N×N, N×$N_R$, and N×(N−$N_R$), respectively, R and $R_1$ are upper-triangular matrices of sizes N×N and $N_R$×N, respectively. Then, one can set $V_{null}(\hat{H}_{SI}(f))$ to be $Q_2$ (in which case $P_{SIC}(f)$ will be of size N×(N−$N_R$))—i.e., those columns of Q that correspond to the rows of R that are all zeros (or very close to zero). It is then observed that $\hat{H}_{SI}(f)P_{SIC}(f)=0$, which is the desired result of placing a null (or substantial null) at each of the receive chains. Note that if the element at the ith row and the jth column of $P_{SIC}(f)$ is zero, then the ith antenna is not used to transmit the jth data stream. Hence, even when all N antennas may be physically connected to corresponding transmit chains (as shown in FIGS. 4, 7, and 9), one can implicitly de-select some of the N antennas for transmission by appropriately setting some of the elements of $P_{SIC}(f)$ to zero. Thus, for a specific transmission, less than N antennas may be used. According to an alternative implementation, perhaps with higher computational complexity, one can also choose $V_{null}(\hat{H}_{SI}(f))$ as those eigenvectors of the projection matrix $K_1(f) = I - \hat{H}_{SI}^H(f)(\hat{H}_{SI}(f)\hat{H}_{SI}^H(f))^{-1}\hat{H}_{SI}(f)$ that correspond to non-zero eigenvalues of $K_1(f)$. It is noted here that since $K_1(f)$ is an N×N idempotent matrix of rank (N−$N_R$), it has exactly (N−$N_R$) eigenvectors corresponding to the eigenvalue of one (1). Equivalently, one can directly choose $K_{null}(\hat{H}_{SI}(f))$ as those eigenvectors of $K_2(f) = \hat{H}_{SI}^H(f)(\hat{H}_{SI}(f)\hat{H}_{SI}^H(f))^{-1}\hat{H}_{SI}(f)$ that correspond to the zero (0) eigenvalue of $K_2(f)$.

Figure 5:
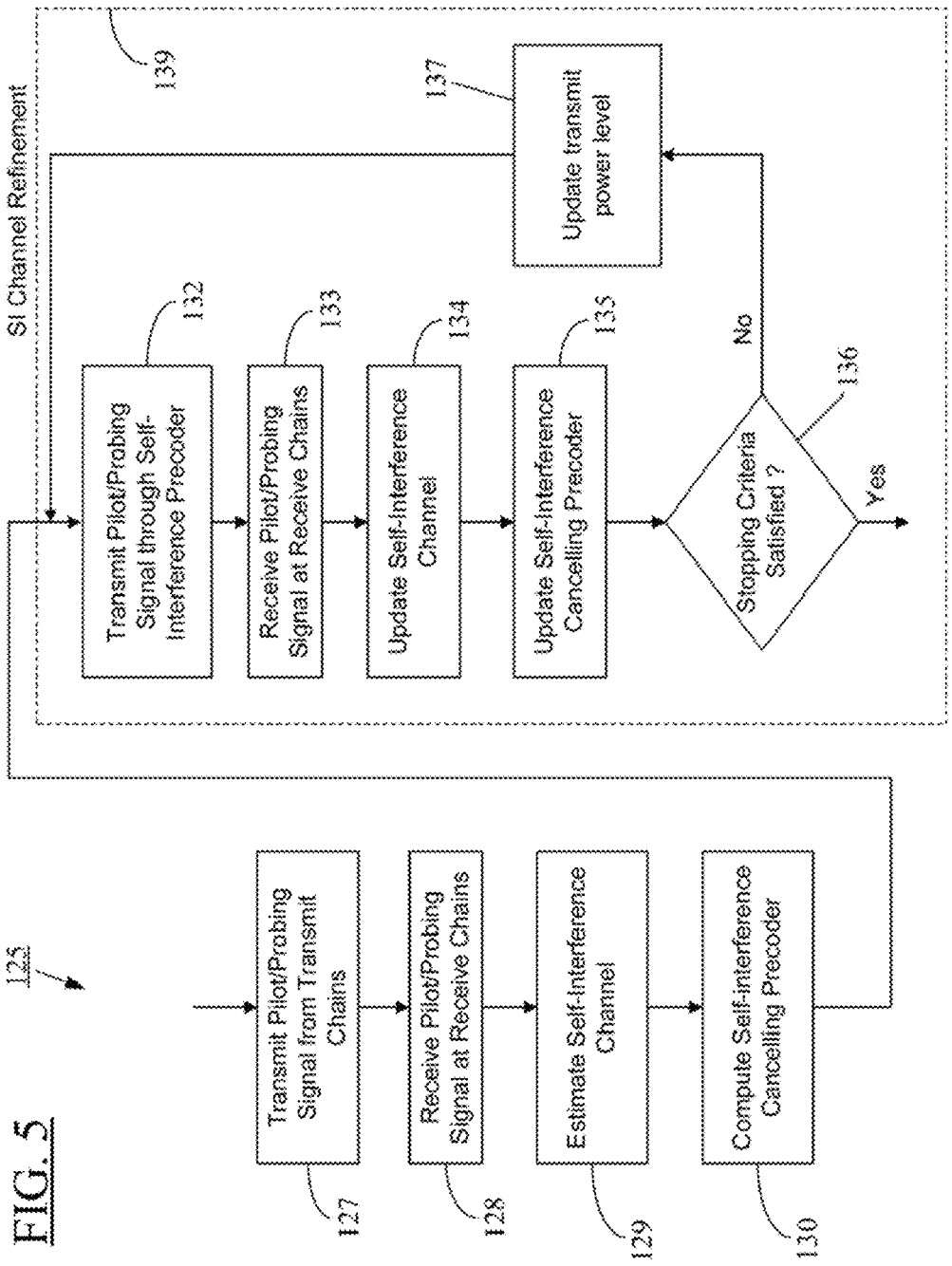
FIG. 5 illustrates an exemplary flowchart to compute and iteratively refine a Self-Interference Cancelling (SIC) precoder according to one embodiment of the present invention.

In one embodiment, to accurately place a null at each of the receive antennas or receive chains, an accurate estimate $\hat{H}_{SI}(f)$ of the SI channel, over the desired frequency band B, may need to be obtained. This may be accomplished through per-antenna pilot sounding at the target frequency band (including frequency "f") from each of the transmit antennas/chains to each of the receive chains as shown in FIG. 4. Discussion of SI channel estimation and corresponding SIC precoder determination using pilot/reference signals 112-113 (FIG. 4) is now provided with reference to FIGS. 4 and 5. It is noted here that FIG. 5 illustrates an exemplary flowchart 125 to compute and iteratively refine the SIC precoder 110 according to one embodiment of the present invention. The pilot or probing signals 112-113 may be pre-determined reference signals and may be initially transmitted at a power level that is small enough to avoid saturating the Analog-to-Digital converters (like the ADC unit 102) in the receive chains, but large enough for $\hat{H}_{SI}(f)$ to be estimated. For example, $\hat{H}_{SI}(f)$ may be estimated as:

$$\hat{H}_{SI}(f) = \underset{H_{SI}}{\arg\min} \, tr\{(R(f) - H_{SI}\pi^{(0)}X(f))(R(f) - H_{SI}\pi^{(0)}X(f))^H\} \quad (3)$$

$$= \frac{1}{\pi^{(0)}} R(f)X^H(f)(X(f)X^H(f))^{-1}$$

where "tr" refers to "trace," "min" refers to "minimum," "arg" refers to "argument," and "arg min" refers to the search of an argument ($H_{SI}$) that achieves the minimum of the quantity in bracket on the right-hand side, $\pi^{(0)}$ denotes a power scaling factor chosen to avoid saturating ADC (e.g., the ADC 102) at the receive chains, $R(f) \equiv [r(f,1), r(f,2), L, r(f, N_p)]$ denotes an $N_R \times N_p$ received signal matrix, $r(f,n)$ denotes an $N_R \times 1$ signal vector measured at the received chains for the nth pilot signal, $X(f) \equiv [x(f,1), x(f,2), L, x(f, N_p)]$ denotes an $N \times N$ pilot matrix, $x(f,n)$ denotes the nth pilot signal vector of size $N \times 1$ transmitted over all (N) antennas, and $N_p$ denotes the number of pilot signals 112 transmitted.

It is observed here that each pilot or probing signal in the set of pilot signals 112-113 may be sent sequentially in time (i.e., one after another). Each such signal may be sent over one transmit antenna. Alternatively, each such signal may comprise N symbols to be sent over all N antennas simultaneously—i.e., at least a portion of each pilot signal is transmitted through each antenna. For example, the portion of the $n^{th}$ pilot signal vector transmitted at the $i^{th}$ antenna may be specified by the element at the $i^{th}$ row and $n^{th}$ column of the pilot matrix X(f). Thus, such transmission of a pilot signal allows transmission of the pilot signal from each transmit antenna in the transmit chain (block 127, FIG. 5) and reception of the pilot signal from each receive antenna in the receive chain (block 128, FIG. 5), so that the receiver chain in the wireless unit can measure the channel from each transmit antenna to each receive antenna.

Using equations (1), (2), and (3), an estimate of the SI channel $H_{SI}(f)$ and the corresponding SIC precoder $P_{SIC}(f)$ can be computed over the desired frequency band (blocks 129-130, FIG. 5). Such estimation may be performed by the SI channel estimation unit 115 and the precoder computation may be performed by the adaptive nulling computation unit 116 shown in FIG. 4. In one embodiment, the computed SIC precoders for different radio frequency bands may be stored in the SIC precoder unit 110 for applications to data streams to be transmitted at corresponding frequencies.

In one embodiment, tasks at blocks 127 through 130 in FIG. 5 may refer to initial determination of the SIC precoder (e.g., when the wireless communication unit is powered on, or when the wireless unit is returning to an active state after an idle state, etc.), in which case, because there may not be any SIC precoder yet determined (or because an earlier-determined SIC precoder may not have continued validity because of, for example, variations in the earlier-estimated SI channel), the initial set of pilot signals 112 may not be transmitted through the SIC precoder unit 110 as illustrated by switches 118 in FIG. 4. However, after initial estimation of SI channel and corresponding initial determination of SIC precoder at blocks 129-130 in FIG. 5, subsequent pilot signals 113 may be now transmitted in an iterative manner through the earlier-determined SIC precoder 110 (as illustrated by switches 119 in FIG. 4) so as to refine the initially-determined SIC precoder as discussed below with reference to blocks 132 through 137 (which are indicated within the dotted block 139) in FIG. 5. The initial set of pilot signals 112 may include $N_p$ number of pilot signals, whereas subsequent set of pilot signals 113 (i.e., pilot signals transmitted through the SIC precoder unit 110) may include $N_{ps}$ number of pilot signals as discussed below. The number of pilot signals $N_p$ and $N_{ps}$ may be empirically determined based on the required accuracy of the self-channel estimate that allows a SIC precoder to place a substantial null at each of the received chain.

The estimate of $H_{SI}(f)$ (determined at block 129 in FIG. 5), and hence the SIC precoder $P_{SIC}(f)$ (determined at block 130 in FIG. 5), may be iteratively refined by transmitting pilot signals 113, possibly at an increased transmit power level, through the updated SIC precoder and then re-estimating the SI channel $H_{SI}(f)$ as indicated at blocks 132 through 137 in FIG. 5. For example, given current estimates $\hat{H}_{SI}^{(n)}(f)$ and corresponding $P_{SIC}^{(n)}(f)$ as well as the current power level scaling $\pi^{(n)}$, where n denotes the iteration index, the new estimates of $\hat{H}_{SI}^{(n+1)}(f)$ and corresponding $P_{SIC}^{(n+1)}(f)$ can be computed using the Least Mean Square (LMS) algorithm as:

$$\hat{H}_{SI}^{(n+1)}(f) = \hat{H}_{SI}^{(n)}(f) - \frac{1}{2}\mu\nabla\Phi(\hat{H}_{SI}(f))\bigg|_{H_{SI}(f) = \hat{H}_{SI}^{(n)}(f)} \quad (4)$$

$$= \hat{H}_{SI}^{(n)}(f) - \frac{1}{2}\mu\pi^{(n)}(R^{(n)}(f) - \pi^{(n)}\hat{H}_{SI}^{(n)}(f)P_{SIC}^{(n)}(f)S^{(n)}(f))$$

$$S^{(n)}(f)^H P_{SIC}^{(n)}(f)^H$$

and $$P_{SIC}^{(n+1)}(f) = V_{null}(\hat{H}_{SI}^{(n+1)}(f)) \quad (5)$$

where $\mu$ denotes a pre-determined step size, $\{\pi^{(n)}\}$ denotes a non-decreasing sequence of power levels, $R^{(n)}(f)$ denotes an $N_R \times N_{ps}$ received signal matrix at the nth iteration, $S^{(n)}(f)$ denotes an $(N-N_R) \times N_{ps}$ matrix of pilot signals transmitted through the current SIC precoder $P_{SIC}^{(n)}(f)$ at the nth iteration, $N_{ps}$ denotes the number of pilot signals transmitted through the SIC precoder, $\nabla$ is a gradient operator, and $\Phi(\hat{H}_{SI}(f))$ is a measure of estimation error of $\hat{H}_{SI}(f)$ defined as:

$$\Phi^{(n)}(\hat{H}_{SI}(f)) = tr\{(R^{(n)}(f) - \hat{H}_{SI}\pi^{(n)}P_{SIC}^{(n)}(f)S^{(n)}(f))(R^{(n)}(f) - \hat{H}_{SI}\pi^{(n)}P_{SIC}^{(n)}(f)S^{(n)}(f))^H\}.$$

The update equations (4) and (5) may be iterated (through performance of tasks at blocks 132 through 137 in FIG. 5) until a certain stopping criterion is reached at block 136 in FIG. 5. Such stopping criteria include, for example, whether a maximum number of iterations is reached (wherein such maximum number may be pre-defined based on, for example, maximum allowable transmit power level to avoid saturation of ADC's in receive chains) or whether the change in the estimation error as measured by $\Phi(\hat{H}_{SI}^{(n)}(f))$ is smaller than a pre-determined threshold (wherein such threshold may be implementation-specific). It is noted here that, in one embodiment, tasks at blocks 129-130 and 134-137 (and related mathematical computations) may be performed by the combination of the SI channel estimation unit 115 and the adaptive nulling computation unit 116 shown in FIG. 4.

Note that since the pilot signals 113 are now transmitted through the SIC precoder 110 (FIG. 4) during the refinement stage indicated by block 139 in FIG. 5 and mathematically represented by equation (4) above, the magnitudes of the signals received at the receive chains may be substantially reduced. Hence, the transmit power level $\pi^{(n)}$ can be increased after each iteration without saturating the ADC's (e.g., the ADC unit 102 in FIG. 4) in the receive chains as the SI channel and the SIC precoder become increasingly accurate. As mentioned earlier, in one embodiment, the iterations in block 139 in FIG. 5 may terminate (block 136) when the maximum transmit power level is reached.

From the discussion so far, it is observed here that, in one embodiment, both $N_p$ (i.e., the number of pilot signals to be sounded over all N antennas) and $N_{ps}$ (i.e. the number of pilot signals to be sounded over all antennas through the SIC precoder) may be completely independent of N (the total number of antennas in the wireless unit). At the initial stage, the pilot matrix X(f) may be of dimension $N \times N_p$. However, during subsequent refinement stages, the pilot matrix S(f) may be of dimension $(N-N_R) \times N_{ps}$ because the SIC precoder 110 (FIG. 4) has dimension $N \times (N-N_R)$ and $N_{ps}$ pilot signals at these stages are sent through the SIC precoder 110 that supports up to $(N-N_R)$ transmit data streams. Like the $N_p$ pilot signals, the $N_{ps}$ pilot signals also may be sent in a sequential manner (i.e., one after another) over all N antennas in the wireless unit at different $N_{ps}$ time instances. In one embodiment, each of the $N_{ps}$ pilot signals may be transmitted over all transmit antennas. In another embodiment, each of the $N_{ps}$ pilot signals may be sent over a subset of the transmit antennas. Here, as before, "$N_R$" represents the selected number of receive antennas (which may also indicate the maximum possible number of receive data streams, but not necessarily the actual number of data streams received) in case of embodiments discussed with reference to FIGS. 4-8, "$N-N_R$" represents the maximum number of allowable transmit data streams (to one or more users) without causing self interference at $N_R$ selected receive antennas, and $N_{ps}$ is the number of pilot signals to be sounded through the SIC precoder 110.

In particular embodiments of the present invention, the relative amplitudes and phases of the signals transmitted through different antennas in a wireless communication unit are changed with the use of an appropriate precoding matrix $P_{SIC}(f)$ (e.g., as represented by the SIC precoder unit 110 in FIG. 4) in order to place a substantial null at each receive chain in the wireless unit in accordance with the measured self interference (SI) channel from each transmit chain to each receive chain. The precoding weight matrix $P_{SIC}(f)$ (and, hence, the SIC precoder) thus "locks" certain relationships in the amplitudes and phases of the signals transmitted from different antennas so as to avoid interfering with wireless unit's own reception during Full Duplex (FD) communications. Such relationships may change as the SI channel changes (e.g., with operating temperature) or as the antennas selected for reception changes (such adaptive receive antenna selection is discussed below with reference to FIG. 7, for example). Each element in the precoding weight matrix $P_{SIC}(f)$ may be a complex number consisting of a magnitude (or amplitude) and a phase rotation. When such complex-valued precoding weight multiplies a to-be-transmitted signal, it changes the signal's amplitude and phase as specified by the precoding weight or coefficient. Because the overall amplitude change may only affect the total transmit signal strength whereas the overall phase change may only affect the total delay of the transmit signals, in one embodiment of the present invention, only a relative change in the amplitudes and phases of signals to be transmitted from different antennas (i.e., amplitude and phase of a signal transmitted from one antenna in relation to amplitudes and phases of signals simultaneously transmitted from other antennas) may be relevant to effectuate desired nulling position/direction at receive antennas.

It is noted here that the SI channel estimation and SIC precoder determination methodology discussed herein with reference to FIGS. 4 and 5 (and also discussed later below with reference to embodiments in other figures) can work with any physical placement of transmit and receive antennas in a wireless communication unit. However, it is understood that the amplitude and phase adjustments as specified by the SIC precoding matrix (as represented by the SIC precoder unit 110 in FIG. 4) may implicitly depend on the physical placement of transmit and receive antennas in the wireless unit through the measured SI channel. Thus, different physical placement of transmit and receive antennas may lead to a different measured SI channel, which, in turn, may change the way the wireless unit should "lock" the relationship of amplitudes and phases of the signals transmitted from different transmit antennas.

Figure 6:
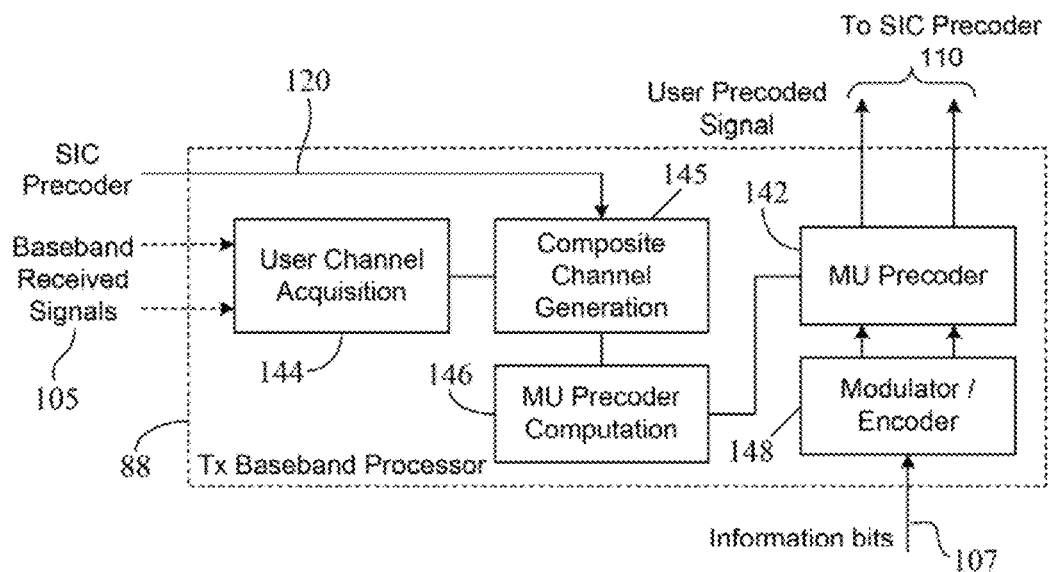
FIG. 6 depicts a block diagram of a transmit (Tx) baseband processor for concatenating a SIC precoder with a multi-user precoder according to one embodiment of the present invention.

FIG. 6 depicts a block diagram of a transmit (Tx) baseband processor (e.g., the Tx baseband processor 88 in the embodiment of FIG. 4) for concatenating a SIC precoder (e.g., the SIC precoder 110 in FIG. 4) with a Multi-User (MU) precoder 142 according to one embodiment of the present invention. Due to increasing popularity of multimedia communications over wireless networks, emerging technologies like Multiple Input Multiple Output (MIMO) have been widely used in modern mobile communication environment (e.g., the LTE network) to meet the demand for higher data rate and better cell coverage without increasing average transmit power or frequency bandwidth. MIMO also improves uplink/downlink peak rates, cell coverage, as well as cell throughput. In MIMO, multiple spatial layers are constructed to simultaneously deliver multiple data streams on a given frequency-time resource, thereby linearly increasing the channel capacity. It is noted here that MIMO is a spatial diversity scheme in which multiple antennas are used at the transmitter and/or the receiver end. A multiple antenna based spatial diversity technology can also be used to increase the data rate (known as "spatial multiplexing"). In spatial multiplexing, data may be divided into separate streams or layers; the streams are then transmitted independently via separate antennas. When the data rate is to be increased for a single User Equipment (UE), the MIMO scheme is referred to as Single User MIMO (SU-MIMO). On the other hand, when individual data streams are assigned to multiple users (or UE's), it is called Multi User MIMO (MU-MIMO).

When a wireless communication unit (e.g., a UE, an access point, etc.) wishes to utilize the available antennas to perform MU-MIMO (e.g., MU beamforming or precoding) to transmit data to multiple users (or user devices) in a network (e.g., the wireless network 20 that may support MU-MIMO transmissions) or, alternatively, to place nulls at one or more users in the network while transmitting to other user(s), the wireless unit may form composite channels by combining user- or user device-specific transmit channel response matrices, denoted by $\{H_m(f)\}_{m=1}^{M}$ where M denotes the number of served users (via MIMO transmissions), with the SIC precoder $P_{SIC}(f)$ 110. The composite channels may be then used to compute the precoding (or beamforming) weights for the MU precoder 142. In other words, the computation of the MU precoders 142, denoted by $\{P_m(f)\}_{m=1}^{M}$, may be based on the effective composite channel matrices $\{\overline{H}_m(f)\}_{m=1}^{M}$ given by $\overline{H}_m(f) = H_m(f) P_{SIC}(f)$ for m=1, 2, L, M.

Each user-specific transmit channel response matrix $H_m(f)$ (as opposed to receive channel response matrices $\{G_q(f)\}_{q=1}^{Q}$ for Q number of users from which MIMO receptions are received as discussed below with reference to FIGS. 7 and 8) may be of size $n_{R,m} \times N$, where $n_{R,m}$ denotes the number of receive antennas of user m, and may be acquired through channel reciprocity in the reverse link on the same frequency band or through explicit quantized feedback of an estimate of the channel $H_m(f)$ from each user m. Each user-specific transmission channel matrix $H_m(f)$ may include a plurality of matrix elements, wherein a matrix element in the $x^{th}$ row and $y^{th}$ column of such a matrix may represent a channel response from the $y^{th}$ transmit antenna of the wireless communication unit to the $x^{th}$ receive antenna of the user device at frequency "f" corresponding to a communication channel (not shown) established between the $y^{th}$ transmit antenna of the wireless unit and the $x^{th}$ receive antenna of the user device in the wireless network supporting MU-MIMO (e.g., the network 20 in FIG. 1). In the MU-MIMO based embodiment of FIG. 6, a user channel acquisition unit 144 is shown to receive baseband signals 105 (optionally from the baseband filtering unit 104 in the receive chain as also shown by dotted lines 105 in FIG. 4), which, in one embodiment, may represent baseband version of signals received from a user m (or user q, whichever is applicable as per discussion below) over a reverse link (not shown) between the user's device and the wireless unit containing the Tx baseband processor 88. These signals 105 may be then used by the channel acquisition unit 144 to determine user-specific transmit channel $H_m(f)$.

A composite channel generation unit 145 may receive the $H_m(f)$ matrix from unit 144 and combine it with the SIC precoder received from the adaptive nulling computation unit 116. For ease of discussion, the SIC precoder computed by unit 116 at frequency "f" (i.e., $P_{SIC}(f)$) and supplied to unit 145 is indicated by reference numeral "120" in FIGS. 4 and 6. It is, however, understood that the precoder weights supplied through connection 120 are the same as those stored in the SIC precoder unit 110 in FIG. 4. In other words, the Tx baseband processor 88 may receive $P_{SIC}(f)$ in "advance" from the adaptive nulling computation unit 116 so as to "guide" the processor 88 in determining the MU precoder. Because $P_{SIC}(f)$ at line 120 is the same $P_{SIC}(f)$ that will be later applied through the SIC precoder unit 110, the "advance" delivery of $P_{SIC}(f)$ 120 "informs" the processor 88 as to what $P_{SIC}(f)$ will be later applied through the SIC precoder unit 110, so that the Tx baseband processor 88 can take this $P_{SIC}(f)$ into account when determining MU precoder at block 146. In one embodiment, an MU precoder $P_m(f)$ may be determined using $\overline{H}_m(f)$ based on the relevant discussion in Q. Spencer, C. Pill, A. Lee Swindlehurst, and M. Haardt, "An Introduction to the Multi-User MIMO Downlink," IEEE Communications Magazine, pp. 60-67, October 2004, which discussion is incorporated herein by reference in its entirety. Different user device-specific MU precoders may be stored in the MU precoder unit 142. Information bits 107 to be transmitted by the wireless communication unit to a specific user (or user device) in the MU-MIMO may be first applied a user-specific MU precoder at block 142 (after being processed at the modulator/encoder block 148) followed by the SIC precoder 110 (for self-interference cancellation) as can be seen from FIGS. 4 and 6. In other words, the MU precoder 142 and the SIC precoder 110 may be concatenated as discussed here to further improve MU-MIMO communications.

Note that since $P_{SIC}(f)$ is of size $N \times (N-N_R)$, the composite channel $\overline{H}_m(f)$ is of size $n_{R,m} \times (N-N_R)$. This reflects the fact that the number of effective transmit antennas has reduced from N to $N-N_R$ because $N_R$ nulls have been placed at the receive chains through the use of the SIC precoder 110.

In the case when the wireless unit employs a slow (instead of fast) MU precoder (or beamformer) computed based on the user channel statistics, such as the transmit channel covariances defined as $C_m(f) = E\{H_m^H(f) H_m(f)\}$ for m=1, 2, L, M, as opposed to the instantaneous channel responses $\{H_m(f)\}_{m=1}^M$, the computation of the slow MU beamformers or precoders $\{P_m(f)\}_{m=1}^M$ may be based on the effective composite channel covariances $\{\overline{C}_m(f)\}_{m=1}^M$ given by $\overline{C}_m(f) = P_{SIC}^H(f) C_m(f) P_{SIC}(f)$ for m=1, 2, L, M. Here, E{x} indicates expected value of "x".

Any (fast or slow) kind of MU precoder or beamformer, such as zero-forcing precoder, maximum Signal-to-Leakage-and-Noise Ratio (SLNR) precoder, Minimum Mean-Squared Error (MMSE) precoder, etc., can be used in combination with the SIC precoder 110. The overall (or "effective") precoder for each user over all the transmit antennas is then the concatenation of the SIC precoder and the MU precoder, i.e., $\overline{P}_m(f) = P_{SIC}(f) P_m(f)$ for m=1, 2, L, M.

In this manner, the design of the MU precoder 142 and the SIC precoder 110 can be separately considered, but the final overall precoder may still place substantial nulls at the receive chains and avoid saturating their ADC.

FIG. 7 shows the embodiment of FIG. 4 additionally including an adaptive receive antenna selection module 152 (and associated antenna selector/switch 154) according to one embodiment of the present invention. To distinguish the portion 82 of a wireless communication unit in FIG. 4, the portion shown in FIG. 7 is identified by reference numeral "150." However, for clarity and ease of discussion, elements, signals, or components in portions 82 and 150 in FIGS. 4 and 7, respectively, having similar functionality or purpose are identified by the same reference numerals in both figures. Also, discussion of such similar entities is not repeated here in view of earlier discussion thereof with reference to FIG. 4. In contrast to the fixed $N_R$ in the embodiment of FIG. 4, in the embodiment of FIG. 7, the selection of $N_R$ receive antennas from the total number of N antennas is performed dynamically and adaptively (using the antenna selection module 152 and the antenna selector/switch 154 for such variable $N_R$), possibly in a frequency-dependent or time-dependent manner as needed, according to the relative demands in the incoming and outgoing data throughput. The discussion of FIG. 7 is provided below in conjunction with FIG. 8, which illustrates exemplary graphs 156-159 for dynamic, frequency-dependent Space Division Duplex (SDD) communication according to one embodiment of the present invention. More specifically, FIG. 8 shows graphs demonstrating how the antenna or space domain may be divided differently between transmissions (Tx) and receptions (Rx) for different frequency bands, depending on the respective channel response of those users to which the wireless communication unit (containing the portion 150) transmits and those from which the wireless unit receives.

Figure 8:
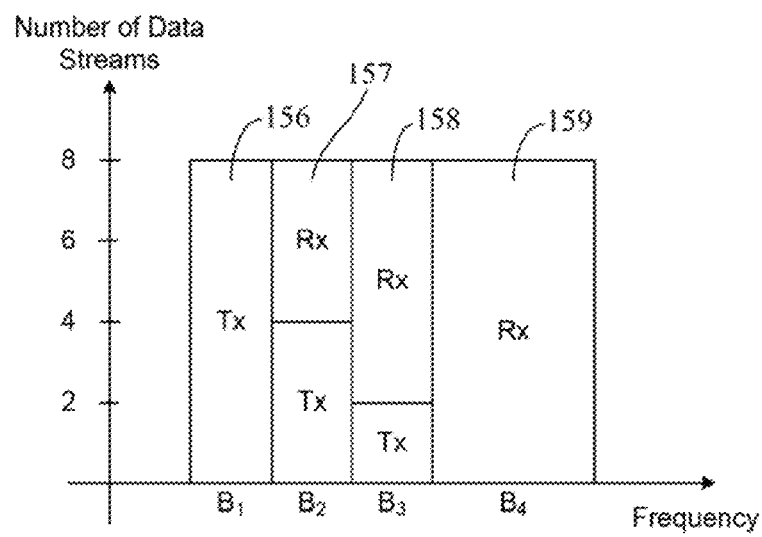
FIG. 8 illustrates exemplary graphs for dynamic, frequency-dependent Space Division Duplex (SDD) communication according to one embodiment of the present invention.

In FIG. 8, a wireless unit (not shown) with a total of N=8 antennas (so that a total of 8 transmit and receive data streams is possible) is used as an example for transmission and reception in different frequency bands $B_1$ through $B_4$. As illustrated in FIG. 8, all 8 antennas may be allocated to only transmission in frequency band 13, (graph 156), while all 8 antennas may be allocated to only reception in frequency band 13, (graph 159), as in FDD communications. When all antennas are used either for only transmission or for only reception, then there may be no issue of self interference. However, in bands B2 and B3, the issue of self-interference may arise and, hence, particular embodiments of the present invention (e.g., the embodiment in FIG. 7) may provide self interference cancellation. In band $B_2$ (graph 157), half of the 8 possible data streams may be allocated to reception while the rest of the data streams may be allocated to transmission (while placing nulls at the receive chains). Thus, in case of embodiment in FIG. 7 (when viewed in the context of FIG. 8), only 4 antenna dimensions may be selected for $B_2$ (and, thus, up to $N_{S,R}$=4 receive data streams can be collected under the self-interference cancellation methodology of one embodiment of the present invention), while $N_{S,T}=4$ transmit data streams may be simultaneously sent using all N=8 antenna dimensions (or a subset containing less than N antennas as mentioned before) (thus satisfying the condition $N_{S,T}N_{S,R}<N$ as per one embodiment of the present invention). In case of band $B_2$, the amplitudes and phases of the signals being sent on these 8 antennas may satisfy 4 equations designed to put nulls to get rid of self-interference on the 4 selected receive antennas. The 4 transmit data streams (in band $B_2$) may be used to determine another 4 equations for the 8 signals to satisfy. With the total of 8 equations (4 for nulls, and 4 for transmit data streams), the 8 radio signals to be transmitted (containing $N_{S,T}=4$ data streams) on the 8 antennas may be precisely determined. Similarly, for the embodiment in FIG. 7 (when viewed in the context of FIG. 8), in band $B_3$ (graph 158), 6 of the 8 antennas may be allocated to reception (thus, up to $N_{S,R}=6$ receive data streams can be collected), while the rest of the 2 antenna dimensions may be allocated to transmission (thus, $N_{S,T}=2$ transmit data streams can be simultaneously sent over all N=8 antennas). In case of band $B_3$, the amplitudes and phases of the radio signals being sent on these 8 antennas may satisfy 6 equations designed to put nulls to get rid of self-interference on the 6 selected receive antennas. The 2 transmit data streams (in band $B_3$) may be used to determine another 2 equations for the 8 radio signals to satisfy. With the total of 8 equations (6 for nulls, and 2 for transmit data streams), the 8 radio signals to be transmitted (containing $N_{S,T}=2$ data streams) on the 8 antennas may be precisely determined.

It is again emphasized here that FIG. 8 is provided merely as an illustration of how receive antennas may be adaptively selected according to one embodiment of the present invention based on the frequency band of operation. In actual implementations, a wireless unit may have more or less than 8 antennas and may operate in many different transmit-receive antenna configurations in different frequency bands. It is noted here that the division in the space-frequency domains (as illustrated by way of the exemplary FIG. 8) may also be changed dynamically and adaptively as often as each Transmission Time Interval (TTI) in an LTE radio frame (not shown). Thus, in addition to or in place of frequency-dependent antenna selection, in one embodiment, antenna selection may be performed in a time-dependent manner as well.

The receive antenna selection process in the embodiment of FIG. 7 may be carried out based on a certain pre-determined criteria using the adaptive antenna selection module 152, whose decision may be used to control the antenna switches or selectors 154 (to which all antennas 83-86 of the wireless unit may be connected as shown in FIG. 7) as well as the adaptive nulling module 116 so that an appropriate SIC precoder of a proper dimension can be computed for the selected receive antennas. Different receive antenna selection criteria may be used. For example, in one embodiment, the wireless unit (through its antenna selection module 152) may choose to select the antennas (from the antennas 83-86) such that the selection maximizes a weighted sum of the bi-directional data throughputs. More precisely, let $S_R$ denote the index set of the $N_R$ selected antennas, and let $J_{S_R}$ denote the corresponding $N_R \times N$ selection matrix whose elements are either zero or one, with each row containing all zeros except at the column corresponding to an index in $S_R$. Also, let $\{G_q(f)\}_{q=1}^Q$ denote the receive-channel response matrices of those served users (e.g., in a MU-MIMO scheme discussed earlier with reference to FIG. 6) from which the wireless communication unit (containing the circuit portion 150) receives signals, where Q denotes the total number of users from which MIMO signals are received by the wireless communication unit and $G_q(f)$ is of size $N \times n_{T,q}$ and $n_{T,q}$ denotes the number of transmit antennas of user q. The receive antenna index set $S_R$ over a frequency band B may be computed as $$S_R = \underset{S'_R}{\mathrm{argmin}} \left\{ w_R \sum_{q=1}^Q \int_{f \in B} \mathrm{logdet}\left(I + \frac{J_{S'_R} G_q(f) G_q^H(f) J_{S'_R}^H}{\sigma_R^2}\right) df + w_T \sum_{m=1}^M \int_{f \in B} \mathrm{logdet}\left(I + \frac{H_m(f) P_{SIC}(f, S'_R) P_{SIC}^H(f, S'_R) H_m^H(f)}{\sigma_{T,m}^2}\right) df \right\}$$

where $w_R$ and $w_T$ are predetermined relative weights on the receive and transmit data throughput, respectively, "det" refers to "determinant," $H_m(f)$ is a user-specific transmit channel response matrix for a user m to which the wireless communication unit transmits (as also mentioned earlier), M denotes the total number of users receiving MIMO transmissions from the wireless communication unit, $P_{SIC}(f,S'_R)$ denotes the corresponding SIC precoder for a hypothesized selection index set $S'_R$, $\sigma_{T,m}^2$ denotes the noise variance of user m to which the device transmitted (wherein, in one embodiment, such noise variance may be determined based on quality of signals fed back from user m), and $\sigma_R^2$ denotes the noise variance of each receive chain in the wireless communication unit (having the circuit portion 150). Other selection criteria apart from maximizing the bi-directional sum data throughput may also be used. For example, in one implementation of the embodiment in FIG. 7, the receive antennas may be selected such that the minimum margin of Signal-to-Noise-plus-Interference-Ratio (SINR) of any data streams (in either direction—i.e., transmit or receive) is maximized or optimized with respect to some corresponding target SINR levels.

FIG. 9 shows the embodiment of FIG. 7 additionally including analog and digital cancellation modules 164 and 165, respectively, according to one embodiment of the present invention. To distinguish the portion 150 of a wireless communication unit in FIG. 7, the portion shown in FIG. 9 is identified by reference numeral "160." However, for clarity and ease of discussion, elements, signals, or components in portions 82, 150 and 160 in FIGS. 4, 7 and 9, respectively, having similar functionality or purpose are identified by the same reference numerals in all of these figures. Also, discussion of such similar entities is not repeated here in view of earlier discussion thereof with reference to FIGS. 4 and 7. However, it is understood that a wireless communication unit can have any of the circuit configurations shown in FIGS. 4, 7, and 9, depending on the desired implementation.

The configuration 160 in FIG. 9 may include an analog cancellation circuitry 164 and possibly a digital cancellation module 165 as proposed in Paper-1 and Paper-2. The analog cancellation circuitry 164 may be implemented using a balun circuit (as discussed, for example, in "RF, RFIC & Microwave Theory, Design," available online at http://www.odyseus.nildram.co.uk/RFMicrowave_Circuits_Files/Balun%20Design.pdf) where a 180-degree shifted version of the transmitted signals (which may be received from an antenna selector/switch 168 which, in turn, may receive the transmitted signals from an RF splitter 170 as shown in FIG. 9) can be generated and used for (self-interference) cancellation at the receive chains. On the other hand, the digital cancellation module 165 may simply re-generate the baseband transmitted signals observed at the receive chains, based on the SI channel estimate and the transmitted digital symbols (wherein the estimate and the symbols are effectively received at module 165 via the "feedback" lines 172 in FIG. 9), and then subtract them from the received baseband signals 173 (from the baseband Rx filtering unit 104) to achieve (additional) self-interference cancellation.

The addition of the analog cancellation circuitry 164 may provide a larger degree of freedom in the choice of the SIC precoder 110 without saturating the ADC in the receive chain (e.g., the ADC 102). Specifically, the computation of the SIC precoder 110 (by the adaptive nulling computation unit 116) may now take into account the receiver combining vectors to better utilize the space/antenna dimension (e.g., as illustrated in FIG. 8) through self-interference alignment in the case when $N_R$ antennas are used to receive less than $N_R$ streams of data. For example, the wireless communication unit (containing the configuration 160) may use 3 receive antennas to receive 2 streams of data while cancelling one interferer. It is understood that when a receiver cancels an interferer, the receive chain in effect places a null at some antenna dimension—referred hereinafter as a "trash" dimension, where the interfering signal resides. In this case, the wireless unit may be configured to "align" the self-interference into the "trash" dimension determined by the receiver combining vector used for cancelling the interferer. Since the receive chain may discard (or not receive) data streams in that "trash" dimension (e.g., to improve received signal clarity, quality, etc.), in one embodiment, the transmit chain may use this "trash" dimension for transmitting signals even if the transmit chain may not be placing any null in that "trash" dimension (e.g., because the receive chain discards any signals received in this "trash" dimension and, hence, there may not be a self-interference issue in this "trash" dimension) as mentioned before with reference to FIGS. 3 through 8. Thus, particular embodiments of the present invention (related to applications of SIC precoders to signal transmissions) may "open up" such an extra dimension (i.e., the "trash" dimension) for signal transmissions (rather than losing it when no such transmission takes place). In other words, the self-interference for the receive chain may be "aligned" in such a way as to open up the receive chain's "trash" dimension for transmit chain to use for transmitting signals.

More precisely, let $V_q(f)$ denote the receiver combining weight matrix of size $n_{S,q} \times N_R$ used to combine the signals from $N_R$ receive antennas into $n_{S,q}$ signal streams for user q, for q=1, 2, L, Q, where Q denotes the number of users (e.g., in a MU-MIMO scheme mentioned earlier with reference to discussion of FIG. 6) from which the wireless communication unit (containing the configuration 160) receives signals. If the total number of received streams $N_{S,R} \equiv \Sigma_{q\,1}{}^Q n_{S,q}$ is less than $N_R$ (i.e., $N_{S,R} < N_R$), which may be the case when, for example, the wireless unit is cancelling ($N_R - N_{S,R}$) interfering streams from other users, then the SIC precoder 110 may be computed (by the nulling computation unit 116 using the methodology similar to that discussed earlier with reference to FIGS. 4 and 5 and equations (1)-(5)) based on the modified SI channel matrix $H'_{SI}(f)$ given by $$H'_{SI}(f) = V(f)H_{SI}(f) = \begin{bmatrix} V_1(f) \\ V_2(f) \\ M \\ V_Q(f) \end{bmatrix} H_{SI}(f)$$

where $V(f) \equiv [V_1(f)^T, V_2(f)^T, L\, V_Q(f)^T]^T$ is an $N_{S,R} \times N_R$ matrix. In this way, in the embodiment of FIG. 9, the SIC precoder 110 is of size $N \times (N - N_{S,R})$ and can therefore be able to transmit $(N - N_{S,R})$ data streams to other users instead of only $(N - N_R)$ streams (which is the case in the embodiments of FIGS. 4 and 7). It is observed here that because $N_{S,R} < N_R$, $(N - N_{S,R}) > (N - N_R)$. Thus, in effect, the wireless communication unit may re-use the $(N_R - N_{S,R})$ antenna dimensions used by its receive chains for cancelling other-user interference as "trash" dimensions, and "align" the self-interference into these dimensions so that more dimensions can be freed up for signal transmissions.

When the embodiment in FIG. 9 is viewed in the context of the exemplary space/antenna dimensions in FIG. 8, it is observed that when all antennas are used either for only transmission (as in case of band B, in FIG. 8) or for only reception (as in case of band $B_4$ in FIG. 8), then there may be no issue of self-interference alignment. However, in case of band $B_2$ in FIG. 8, the self-interference aligning methodology in FIG. 9 may use all N=8 antenna dimensions for receiving (up to) $N_{S,R}=4$ data streams based on a certain receiver combining matrix $V(f)$, while $N_{S,T}=4$ (or more) transmit data streams may be set for simultaneous transmission over all N=8 antennas (thus also satisfying the condition $N_{S,T} + N_{S,R} \leq N$ as per one embodiment of the present invention). For band $B_2$, the amplitudes and phases of the signals being sent on these 8 antennas may satisfy (up to) 4 equations designed to get rid of self-interference (in the receive chain) after the receiver combining matrix is used to generate combined received signal for demodulating the (up to) 4 receive data streams. Similarly, in case of band $B_3$ in FIG. 8, the self-interference aligning methodology in FIG. 9 may use all N=8 antennas for receiving (up to) $N_{S,R}=6$ data streams based on a certain receiver combining matrix $V(f)$, while $N_{S,T}=2$ (or more) transmit data streams may be sent for simultaneous transmission over all N=8 antenna dimensions. For band $B_3$, the amplitudes and phases of the signals being sent on these 8 antennas may satisfy (up to) 6 equations designed to put nulls to get rid of self-interference on the (up to) 6 selected receive antennas.

FIG. 10 is a block diagram of an exemplary mobile handset or UE 175 according to one embodiment of the present invention. The UE 175 may be considered a wireless communication unit and may represent either of the UE's 12, 16 in FIG. 1 or any of the UEs 42, 50, or 70 in FIG. 2, and may be configured to perform the methodologies shown in the flowcharts in FIGS. 3 and 5 using any individual or a combination of the configurations in FIGS. 4, 6-7, and 9. As shown in FIG. 10, the UE or mobile device 175 may include a transceiver 177, an antenna unit 178 (e.g., the antenna unit 13 in case of UE 12, or the antenna unit 17 in case of UE 16, etc.), a processor 180, and a memory 182 (which may, in some embodiments, also include memory on UE's Subscriber Identity Module (SIM) card). The antenna unit 178 may include multiple antennas for simultaneous transmission and reception (as shown, for example, in the embodiments of FIGS. 4, 7, and 9). Because the techniques described herein related to self-interference cancellation may be equally applied to both uplink and downlink communications in LTE, the UE 175 in the embodiment of FIG. 10 may also include a self-interference (SI) cancellation module 183 (which may include a part or all of any of the configurations shown in FIGS. 4, 6-7, and 9) for self-interference cancellation during simultaneous transmissions and receptions. The SI cancellation module 183 may be a part of the UE's processor unit 180 as shown, or may be a separate unit coupled to the processor 180 and/or the transceiver 177 to perform the desired SIC precoder-based initial processing of transmit chain signals. In another embodiment, any of the configurations shown in FIGS. 4, 6-7, and 9 may be implemented as part of the SI cancellation module 183 through a combination of the processor 180, the transceiver 177, the antenna unit 178, and the memory 182. For example, the SIC precoder 110 may be stored in the memory 182, the processing components (e.g., the SI channel estimation unit 115, the adaptive nulling computation unit 116, the baseband processing units 88, 106, etc.) may be implemented as part of the processor 180, and the RF components in the transmit and receive chains (e.g., components 94, 96, 98, 100, etc.) may form part of the transceiver 177 and the antenna unit 178. Other arrangements to implement the functionality of the SI cancellation module 183 in the UE 175 may be devised as well. In particular embodiments, some or all of the functionalities described above (e.g., transmission and reception of MIMO or non-MIMO signals using antennas in the antenna unit 178 and transceiver 177; self-interference cancellation of transmitted signals via SI cancellation module 183; determination of channel estimations and SIC precoders; storage of precoding weights in the memory 182 or in an internal memory (not shown) of the processor 180; transmission of SIC precoder-applied data streams using transceiver 177 and antennas in the antenna unit 178; transmission and reception of MIMO signals in SU-MIMO and MU-MIMO schemes; etc.) as being provided by mobile communication units (such as wireless devices or other forms of UE) may be provided by the UE processor 180 (with processing support from the SI cancellation module 183, as needed) executing instructions stored on a computer-readable medium, such as the memory 182 shown in FIG. 10. Alternative embodiments of the UE 175 may include additional components beyond those shown in FIG. 10 that may be responsible for enabling the UE's 175 communication with a base station (e.g., the eNB 22 in the network 20) and for providing certain aspects of the UE's functionality, including any of the functionality described above and/or any functionality necessary to support the solution as described above.

FIG. 11 is a block diagram of an exemplary eNB or a similar wireless access node (or base station) 185 according to one embodiment of the present invention. The eNB 185 may be considered a wireless communication unit and may represent any of the base stations 22 (in FIG. 1), 36, 46, or 58 (in FIG. 2), and may be configured to perform the methodologies shown in the flowcharts in FIGS. 3 and 5 using any individual or a combination of the configurations in FIGS. 4, 6-7, and 9. The eNB 185 may include a baseband processor 187 to provide radio interface with the mobile handsets (e.g., UEs 12, 16 in the carrier network 20) via eNB's Radio Frequency (RF) transmitter 189 and RF receiver 190 units coupled to the eNB's antenna unit 192 (e.g., the antenna unit 29 shown in FIG. 1). In one embodiment, the processor 187 may receive transmissions (e.g., MU-MIMO signals or non-MIMO signals depending on the network configuration) from the UEs (e.g., UEs 12, 16 in FIG. 1) via the combination of the antenna unit 192 and the receiver 190, whereas eNB's transmissions to the UEs (e.g., UEs 12, 16 in FIG. 1) may be carried out via the combination of the antenna unit 192 and the transmitter 189. The processor 187 may be configured (in hardware and/or software) to perform self-interference cancellation as described herein. In that regard, the processor 187 may include a processing unit 194 having a SI cancellation module 195 (which may include a part or all of any of the configurations shown in FIGS. 4, 6-7, and 9) to perform self-interference cancellation as described herein. In one embodiment, the SI cancellation module 195 may be a separate unit coupled to the processing unit 194 and/or at least the RF transmitter 189 to perform the desired SIC precoder-based initial processing of transmit chain signals. In another embodiment, any of the configurations shown in FIGS. 4, 6-7, and 9 may be implemented as part of the SI cancellation module 195 through a combination of the processor 187, the RF transmitter 189, the RF receiver 190, the antenna unit 192, and a memory 196. For example, the SIC precoder 110 may be stored in the memory 196, the processing components (e.g., the SI channel estimation unit 115, the adaptive nulling computation unit 116, the baseband processing units 88, 106, etc.) may be implemented as part of the processing unit 194, and the RF components in the transmit and receive chains (e.g., components 94, 96, 98, 100, etc.) may form part of the respective transmitter and receiver units 189-190 and the antenna unit 192. Other arrangements to implement the functionality of the SI cancellation module 195 in the base station or access point 185 in FIG. 11 may be devised as well.

The processing unit 194 may be in communication with the memory 196 to process and store relevant information for the cell. A scheduler (e.g., the scheduler 198 in FIG. 11) may be part of the eNB 185 and may provide the scheduling decisions for UEs (e.g., UEs 12, 16, 42, etc.) based on a number of factors such as, for example, QoS (Quality of Service) parameters, UE buffer status, uplink channel feedback report received from UEs, UE capabilities, etc. The scheduler 198 may have the same data structure as a typical scheduler in an eNB in an LTE system. The processor 187 may also provide additional baseband signal processing (e.g., mobile device registration, channel signal information transmission, radio resource management, etc.) as required. The processing unit 194 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above (e.g., transmission and reception of MIMO or non-MIMO signals using antennas in the antenna unit 192 and RF transmitter and receiver 189-190; self-interference cancellation of transmitted signals via SI cancellation module 195; determination of channel estimations and SIC precoders; storage of precoding weights in the memory 196 of the processor 187; transmission of SIC precoder-applied data streams using RF transmitter 189 and antennas in the antenna unit 192; transmission and reception of MIMO signals in SU-MIMO and MU-MIMO schemes; etc.) as being provided by a mobile communication unit (such as a wireless access node/point, a mobile base station, a base station controller, a node B, an enhanced node B, an HeNB, a home base station, a femtocell base station, and/or any other type of mobile communications node) may be provided by the processing unit 194 (with processing support from the SI cancellation module 195, as needed) executing instructions stored on a computer-readable data storage medium, such as the memory 196 shown in FIG. 11.

The eNB 185 may further include a timing and control unit 199 and a core network interface unit 200 as illustrated in FIG. 11. The control unit 199 may monitor operations of the processor 187 and the network interface unit 200, and may provide appropriate timing and control signals to these units. The interface unit 200 may provide a bi-directional interface for the eNB 185 to communicate with a core network (e.g., the core network 28 in the embodiment of FIG. 1) to facilitate administrative and call-management functions for mobile subscribers operating in the corresponding carrier network (e.g., the carrier network 20) through eNB 185.

Alternative embodiments of the base station 185 may include additional components responsible for providing additional functionality, including any of the functionality identified above and/or any functionality necessary to support the solution as described above. Although features and elements are described above in particular combinations, each feature or element can be used alone without the other features and elements or in various combinations with or without other features and elements. The methodology provided herein (related to self-interference cancellation in SDD wireless communications) may be implemented in a computer program, software, or firmware incorporated in a computer-readable storage medium (e.g., the memory 182 in FIG. 10 or the memory 196 in FIG. 11) for execution by a general purpose computer or a processor (e.g., the processor 180 in FIG. 10 or the processing unit 194 in FIG. 11 implementing functionalities of respective SI cancellation modules 183 and 195). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method to perform Full Duplex (FD) (i.e., simultaneous bi-directional transmission and reception) Space Division Duplex (SDD) communication using a Self-Interference Cancelling (SIC) precoder that applies different antenna phase shifts and amplitude scales to the transmitted signals to force them to be in the null space of the selected receive antennas. Thus, a wireless communication unit can place nulls at each of its receive antennas digitally at baseband for one or more frequency bands. The SIC precoder may be computed based on the self-interference channel from the transmit chain(s) to the receive chain(s). Different SIC precoders may be adaptively selected and stored digitally for different frequency bands. Subsequent single or multi-user precoder can be applied in concatenation with the SIC precoder to transmit signals to one or more users while receiving signals from one or more users simultaneously over the same frequency band. Particular embodiments of the present invention thus provide a method of exploiting the ever-increasing number of antennas in wireless access nodes or devices to more fully and efficiently utilize the valuable spectrum by allowing the antennas to transmit and receive simultaneously over the entire available spectrum. Particular embodiments may also be beneficial when the distance between the communication devices are short so that the transmit and receive power levels are more comparable.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of providing full-duplex communication in a pre-determined frequency band using a wireless communication unit having a plurality of antennas, the method comprising the steps of:
   the wireless unit receiving one or more receive data streams in the pre-determined frequency band utilizing a first subset of the plurality of antennas, wherein the first subset includes at least one antenna from the plurality of antennas as a receive antenna;
   the wireless unit simultaneously transmitting one or more transmit data streams in the pre-determined frequency band utilizing a second subset of the plurality of antennas, wherein the second subset includes less than or equal to a total number of antennas in the plurality of antennas as transmit antennas, wherein at least one antenna is shared for simultaneous transmission and reception;
   the wireless unit determining a Self-Interference Cancelling (SIC) precoder based on a null space of an estimate of a Self-Interference (SI) channel matrix for the pre-determined frequency band; and
   based on the determined SIC precoder, the wireless unit adjusting relative amplitudes and relative phases of radio signals carrying the transmit data streams that are transmitted through the transmit antennas in the pre-determined frequency band such that destructive interference reduces a magnitude of the radio signals received at each receive antenna when transmitting in the pre-determined frequency band.

2. The method of claim 1, wherein the first subset of the plurality of antennas includes a fixed number of antennas from the plurality of antennas to operate as receive antennas.

3. The method of claim 1, wherein the pre-determined frequency band includes any frequency band from a plurality of pre-determined frequency bands.

4. The method of claim 3, wherein the step of the wireless unit determining the SIC precoder includes:
   the wireless unit determining a plurality of SIC precoders, each SIC precoder corresponding to one of the plurality of pre-determined frequency bands; and
   the wireless unit selecting the SIC precoder from the plurality of SIC precoders depending on which of the pre-determined frequency bands the radio signals are transmitted in.

5. The method of claim 1, wherein the step of the wireless unit receiving data streams utilizing the first subset of the plurality of antennas includes:
   the wireless unit dynamically selecting one or more of the plurality of antennas to be included in the first subset in a frequency-dependent manner.

6. The method of claim 5, wherein the step of the wireless unit dynamically selecting one or more of the plurality of antennas includes:
   the wireless unit selecting one or more of the plurality of antennas to be included in the first subset associated with the pre-determined frequency band in such a manner as to maximize a weighted sum of a transmission throughput and a reception throughput, wherein the transmission throughput is associated with Multiple-Input Multiple-Output (MIMO) transmissions from the wireless unit to a first plurality of users, and wherein the reception throughput is associated with MIMO receptions by the wireless unit from a second plurality of users.

7. The method of claim 1, wherein the step of the wireless unit receiving data streams utilizing the first subset of the plurality of antennas includes:
   the wireless unit dynamically selecting one or more of the plurality of antennas to be included in the first subset in a time-dependent manner.

8. The method of claim 1, wherein the step of the wireless unit transmitting one or more transmit data streams includes:
   the wireless unit transmitting the one or more transmit data streams to a first plurality of users, and
   wherein the step of the wireless unit receiving one or more receive data streams includes:
   the wireless unit receiving the one or more receive data streams from a second plurality of users.

9. The method of claim 1, wherein the step of the wireless unit determining the SIC precoder further includes:

the wireless unit determining the SIC precoder based on an estimate of a Self Interference (SI) channel matrix for the pre-determined frequency band, wherein the SI channel matrix includes a plurality of matrix elements, and wherein a matrix element in an $i^{th}$ row and a $j^{th}$ column of the SI channel matrix represents a channel response from a $j^{th}$ transmit antenna in the plurality of antennas to an $i^{th}$ receive antenna at a given frequency in the pre-determined frequency band corresponding to a communication channel established between the $j^{th}$ transmit antenna and the $i^{th}$ receive antenna, wherein both "I" and "j" are integers and greater than or equal to two; and wherein the step of the wireless unit adjusting the relative amplitudes and relative phases of the radio signals further includes:

applying the SIC precoder to each transmission in the pre-determined frequency band from each transmit antenna, thereby shaping all transmissions to collectively destructively interfere at each receive antenna upon being transmitted from the corresponding transmit antennas.

10. The method of claim 9, wherein the step of the wireless unit determining the SIC precoder includes one of the following:

the wireless unit determining the SIC precoder as eigenvectors of a projection matrix $K_1(f) \equiv I - \hat{H}_{SI}^H(f)(\hat{H}_{SI}(f)\hat{H}_{SI}^H(f))^{-1}\hat{H}_{SI}(f)$ that correspond to non-zero eigenvalues of $K_1(f)$, wherein "I" is an identity matrix, $\hat{H}_{SI}(f)$ is the estimate of the SI channel matrix $H_{SI}(f)$, $\hat{H}_{SI}^H(f)$ is a Hermitian transpose of $\hat{H}_{SI}(f)$, and f is the given frequency in the pre-determined frequency band;

the wireless unit determining the SIC precoder as eigenvectors of $K_2(f) \equiv \hat{H}_{SI}^H(f)(\hat{H}_{SI}(f)\hat{H}_{SI}^H(f))^{-1}\hat{H}_{SI}(f)$ that correspond to a zero eigenvalue of $K_2(f)$; and the wireless unit determining the SIC precoder as a matrix whose columns represent a set of orthonormal basis vectors of a right null space of $\hat{H}_{SI}(f)$.

11. The method of claim 9, further comprising the steps of:

the wireless unit transmitting a first pre-determined number of pilot signals, wherein each pilot signal in the first pre-determined number of pilot signals is transmitted in the pre-determined frequency band utilizing a third subset of the transmit antennas, wherein the third subset includes at least one of the transmit antennas;

the wireless unit determining an initial version of the estimate of the SI channel matrix based on receptions of the first pre-determined number of pilot signals at each receive antenna; and the wireless unit determining an initial version of the SIC precoder based on the initial version of the estimate of the SI channel matrix.

12. The method of claim 11, further comprising the step of:

the wireless unit iteratively refining the initial versions of the estimate of the SI channel matrix and the SIC precoder until a pre-determined criterion is satisfied.

13. The method of claim 12, wherein the step of the wireless unit iteratively refining the initial versions of the estimate of the SI channel matrix and the SIC precoder includes:

the wireless unit applying the initial version of the SIC precoder to a second pre-determined number of pilot signals;

the wireless unit transmitting the SIC precoder-applied second pre-determined number of pilot signals in the pre-determined frequency band utilizing a fourth subset of the transmit antennas, wherein the fourth subset of the transmit antennas includes less than or equal to all transmit antennas;

the wireless unit determining an updated version of the estimate of the SI channel matrix based on receptions of the second pre-determined number of pilot signals at each receive antenna;

the wireless unit determining an updated version of the SIC precoder based on the updated version of the estimate of the SI channel matrix; and until the pre-determined criterion is satisfied, the wireless unit iteratively refining the updated versions of the estimate of the SI channel matrix and the SIC precoder through transmissions and receptions of the second pre-determined number of pilot signals having been applied a most-recently updated version of the SIC precoder prior to each iteration-specific transmission.

14. The method of claim 13, wherein the pre-determined criterion includes one of the following:

a pre-determined number of iterations being reached;

a change in a measure of a channel estimation error based on receptions of the second pre-determined number of pilot signals at each receive antenna being smaller than a pre-determined threshold prior to next iteration; and a maximum transmit power level being reached for each pilot signal in the second pre-determined number of pilot signals.

15. The method of claim 13, further comprising:

the wireless unit increasing the transmit power level of each pilot signal in the second pre-determined number of pilot signals prior to each iteration.

16. The method of claim 1, wherein the wireless communication unit is configured to perform Multi-User (MU) Multiple-Input Multiple-Output (MIMO) transmissions to a plurality of user devices, and wherein the method further comprises the steps of:

the wireless unit determining a user device-specific MU precoder for the pre-determined frequency band using the SIC precoder for the pre-determined frequency band; and the wireless unit applying the user device-specific MU precoder and the SIC precoder to each user device-specific transmission therefrom in the pre-determined frequency band.

17. The method of claim 16, wherein the step of the wireless unit determining the user-device specific MU precoder includes:

the wireless unit determining a user-device specific channel response matrix for the pre-determined frequency band for at least one of the plurality of user devices, wherein each user-device specific channel response matrix includes a corresponding plurality of matrix elements, and wherein a matrix element in an $x^{th}$ row and a $y^{th}$ column of the user-device specific channel response matrix represents a channel response from a $y^{th}$ transmit antenna of the wireless unit to an $x^{th}$ receive antenna of the corresponding user device at a given frequency in the pre-determined frequency band corresponding to a communication channel established between the $y^{th}$ transmit antenna of the wireless unit and the $x^{th}$ receive antenna of the corresponding user device, wherein both "x" and "y" are integers and greater than or equal to two; and the wireless unit combining at least one user-device specific channel response matrix with the SIC precoder as part of determining a corresponding user device-specific MU precoder.

18. The method of claim 1, wherein the method further comprises:
- the wireless unit receiving a total of $n_S$ number of Multiple-Input Multiple-Output (MIMO) data streams from a plurality of user devices using receiver combining weights with an $N_R$ number of receive antennas, wherein $N_R > n_S$;
- the wireless unit computing a modified channel matrix taking into account the receiver combining weights;
- the wireless unit determining the SIC precoder based on the modified channel matrix; and
- the wireless unit simultaneously transmitting a number of transmit data streams through the SIC precoder.

19. The method of claim 1, wherein the wireless unit configures all transmit antennas to collectively transmit the radio signals that destructively interfere at each receive antenna.

20. A wireless communication unit having a plurality of antennas to provide full-duplex communication at a given frequency in a pre-determined frequency band, wherein the wireless communication unit is configured to perform the following:
- receive one or more receive data streams in the pre-determined frequency band utilizing a first subset of the plurality of antennas, wherein the first subset includes at least one antenna from the plurality of antennas as a receive antenna;
- simultaneously transmit one or more transmit data streams in the pre-determined frequency band utilizing a second subset of the plurality of antennas as transmit antennas, wherein the second subset includes less than or equal to a total number of antennas in the plurality of antennas, wherein at least one antenna is shared for simultaneous transmission and reception;
- determine a Self-Interference Cancelling (SIC) precoder based on a null space of an estimate of a Self-Interference (SI) channel matrix for the predetermined frequency band; and
- based on the determined SIC precoder, adjust relative amplitudes and relative phases of radio signals carrying the transmit data streams that are transmitted through the transmit antennas in the pre-determined frequency band such that destructive interference reduces a magnitude of the radio signals received at each receive antenna when transmitting in the pre-determined frequency band.

21. The wireless unit of claim 20, wherein at least two antennas from the plurality of antennas are at geographically-distributed locations.

* * * * *

UNITED STATES PATENT AND TRADEMARK OFFICE
CERTIFICATE OF CORRECTION

PATENT NO. : 9,019,849 B2
APPLICATION NO. : 13/290677
DATED : April 28, 2015
INVENTOR(S) : Hui et al.

It is certified that error appears in the above-identified patent and that said Letters Patent is hereby corrected as shown below:

In the specification

In Column 7, Line 41, delete "(COMP)" and insert -- (CoMP) --, therefor.

In Column 14, Line 51, delete "$K_{null}(\hat{H}_{SI}(f))$" and insert -- $V_{null}(\hat{H}_{SI}(f))$ --, therefor.

In Column 15, Line 22, delete "an NxN" and insert -- $NxN_p$ --, therefor.

In Column 19, Line 57, delete "$n_{R,m}x(N-N_R)$." and insert -- $H_{R,m}x(N-N_R)$. --, therefor.

In Column 20, Line 52, delete "band 13," and insert -- band $B_1$ --, therefor.

In Column 20, Line 53, delete "band 13," and insert -- band $B_4$ --, therefor.

In Column 20, Lines 56-57, delete "bands B2 and B3," and insert -- bands $B_2$ and $B_3$, --, therefor.

In Column 24, Line 13, delete "band B," and insert -- band $B_1$ --, therefor.

Signed and Sealed this
Twelfth Day of January, 2016

Michelle K. Lee
*Director of the United States Patent and Trademark Office*